US008902440B2

(12) United States Patent
Kudo

(10) Patent No.: US 8,902,440 B2
(45) Date of Patent: Dec. 2, 2014

(54) OPTICAL SCANNING APPARATUS AND AN IMAGE FORMING APPARATUS USING THE SAME WHICH IS CAPABLE OF REDUCING PITCH UNEVENNESS IN WAVE OPTICS AND SUB-SCANNING FIELD CURVATURE

(75) Inventor: Genichiro Kudo, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 46 days.

(21) Appl. No.: 13/598,797

(22) Filed: Aug. 30, 2012

(65) Prior Publication Data

US 2013/0057890 A1    Mar. 7, 2013

(30) Foreign Application Priority Data

Sep. 1, 2011    (JP) .................................. 2011-190760

(51) Int. Cl.

| | | |
|---|---|---|
| G06F 3/12 | (2006.01) | |
| H04N 1/04 | (2006.01) | |
| H04N 1/46 | (2006.01) | |
| G03G 15/28 | (2006.01) | |
| G06K 15/02 | (2006.01) | |
| G03G 15/04 | (2006.01) | |
| G02B 26/10 | (2006.01) | |

(52) U.S. Cl.
CPC ............... G02B 26/10 (2013.01); G03G 15/28 (2013.01); G06K 15/02 (2013.01); G03G 15/0409 (2013.01)
USPC ........... 358/1.13; 358/1.1; 358/474; 358/497; 358/505

(58) Field of Classification Search
USPC ............... 358/1.1, 1.13, 3.24, 3.27, 505, 501, 358/401, 448, 474, 496, 497; 359/17, 19, 359/201.1, 201.2, 202.1, 203.1, 204.1, 359/204.4, 205.1, 207.6, 208.1, 208.2, 21.5, 359/214.1, 215.1, 223.1, 226.2
See application file for complete search history.

(56) References Cited

U.S. PATENT DOCUMENTS

| | | | |
|---|---|---|---|
| 6,166,842 A | 12/2000 | Aoki et al. | |
| 6,288,819 B1 | 9/2001 | Aoki et al. | |
| 6,348,988 B2 | 2/2002 | Aoki et al. | |
| 7,561,319 B2* | 7/2009 | Ishibe | 359/207.1 |
| 2001/0053014 A1* | 12/2001 | Aoki et al. | 359/205 |
| 2002/0105707 A1* | 8/2002 | Hayashi | 359/196 |
| 2003/0043442 A1* | 3/2003 | Ishihara et al. | 359/205 |
| 2011/0317234 A1* | 12/2011 | Ominato et al. | 359/206.1 |

FOREIGN PATENT DOCUMENTS

| | | |
|---|---|---|
| JP | 11271658 A | 10/1999 |
| JP | 2009014953 A | 1/2009 |

* cited by examiner

*Primary Examiner* — Ngon Nguyen
(74) *Attorney, Agent, or Firm* — Rossi, Kimms & McDowell LLP

(57) ABSTRACT

An optical scanning apparatus, including: a light source unit; a deflection unit; an incident optical system; and an imaging optical system, wherein at least one optical surface of a plurality of imaging lenses included in an imaging optical system has a non-circular shape in a sub-scanning section perpendicular to a main scanning direction, and a non-circular amount of the non-circular shape changes along the main scanning direction, and wherein the followings are satisfied: $ds(Y=0)<0$; and $ds(Y=Ymax)>0$, where $ds(Y=0)$ and $ds(Y=Ymax)$ respectively represent a paraxial field curvature at a center position in a sub-scanning direction perpendicular to the main scanning direction and a paraxial field curvature in the sub-scanning direction at a maximum image height in an effective scanning range of the surface to be scanned by the beam from the light source unit in the main scanning direction, among field curvatures at a center position in the effective scanning range.

9 Claims, 15 Drawing Sheets

FIELD CURVATURE IN SUB-SCANNING DIRECTION
(GAUSS IMAGE PLANE)(mm)

IMAGE HEIGHT [mm]

FIELD CURVATURE IN SUB-SCANNING DIRECTION
(WAVE OPTICS IMAGE PLANE)(mm)

IMAGE HEIGHT [mm]

GAUSS IMAGE PLANE IN SUB-SCANNING DIRECTION

GAUSS IMAGE PLANE IN MAIN SCANNING DIRECTION

PITCH UNEVENNESS AND BEAM GRAVITY POSITION
BY OPTICAL FACE TANGLE ERROR
(THREE ARC-MINUTE INCLINATION)

OPTICAL SCANNING APPARATUS AND AN IMAGE FORMING APPARATUS USING THE SAME WHICH IS CAPABLE OF REDUCING PITCH UNEVENNESS IN WAVE OPTICS AND SUB-SCANNING FIELD CURVATURE

BACKGROUND OF THE INVENTION

1. Field of the Invention

The present invention relates to an optical scanning apparatus and an image forming apparatus using the optical scanning apparatus, and is suitable for an image forming apparatus such as a laser beam printer, a digital copying machine, or a multifunction printer, which performs an electrophotography process.

2. Description of the Related Art

Conventionally, there are proposed various optical scanning apparatuses used for image forming apparatuses such as a laser beam printer and a digital copying machine. In these optical scanning apparatuses, a diverging beam emitted from a light source unit such as a semiconductor laser is guided to a deflection surface of a deflection unit such as a polygon mirror (optical deflector) by an incident optical system formed of a collimator lens, a cylindrical lens, and the like.

In this case, the diverging beam emitted from the light source unit is converted into a substantially collimated beam by the collimator lens or the like. Then, in order to compensate an optical face tangle error of the deflection surface, the beam converted into the substantially collimated beam is caused to form a line image on the deflection surface or in a vicinity thereof by a cylindrical lens having refractive power only in a sub-scanning direction. Then, the beam deflected by the deflection surface of the deflection unit is condensed by an imaging optical system having fθ characteristics, and by rotation action of the deflection unit, a light spot scans a drum surface of a photosensitive member as a surface to be scanned at substantially constant speed so as to form image information on the photosensitive drum surface.

Many optical scanning apparatus have the following structure. The imaging optical system includes a first lens unit having refractive power mainly in a main scanning direction, and a second lens unit having refractive power mainly in the sub-scanning direction. Further, the deflected beam from the deflection unit forms a spot on the surface to be scanned. In addition, in a sub-scanning section, the deflection surface and the surface to be scanned have a substantially conjugate relationship. Thus, a spot forming position shift in the sub-scanning section due to a deflection surface tangle error (optical face tangle error) is reduced. In other words, the imaging optical system constitutes an optical face tangle error compensation optical system.

Conventionally, as to such the optical scanning apparatuses, there is known an optical scanning apparatus in which design optical face tangle error performance is improved and a field curvature in the sub-scanning direction (sub-scanning field curvature) is reduced (U.S. Pat. No. 7,561,319).

The optical scanning apparatus described in Japanese Patent Application Laid-Open No. 2009-14953 discloses a technology for reducing both a sub-scanning field curvature and an imaging position shift (pitch unevenness) due to a geometric optical face tangle error of the deflection surface simultaneously. In the method of compensating the pitch unevenness due to the geometric optical face tangle error of the deflection surface, if the optical face tangle error occurs, it may be difficult to reduce both the sub-scanning field curvature and the gravity position shift of a spot intensity (amplitude) distribution on the surface to be scanned. Therefore, it is necessary to determine design performance from a wave optics viewpoint instead of a geometric method.

SUMMARY OF THE INVENTION

An optical scanning apparatus according to the present invention includes: a light source unit; a deflection unit which deflects a beam from the light source unit for scanning a surface to be scanned in a main scanning direction; an incident optical system which forms a focal line image of the beam from the light source unit on one of a deflection surface of the deflection unit and a vicinity thereof; and an imaging optical system including a plurality of imaging lenses for forming an image of the beam deflected by the deflection surface on the surface to be scanned, wherein at least one optical surface of the plurality of imaging lenses included in the imaging optical system has a non-circular shape in a sub-scanning section perpendicular to the main scanning direction, and a non-circular amount of the non-circular shape changes along the main scanning direction, and wherein the following conditions are satisfied:

$$ds(Y=0)<0;$$

and $$ds(Y=Y\max)>0,$$

where ds(Y=0) and ds(Y=Ymax) respectively represent a paraxial field curvature at a center position in a sub-scanning direction perpendicular to the main scanning direction and a paraxial field curvature in the sub-scanning direction at a maximum image height in an effective scanning range of the surface to be scanned by the beam from the light source unit in the main scanning direction, among field curvatures at a center position in the effective scanning range.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

It is an object of the present invention to provide an optical scanning apparatus, which is capable of reducing pitch unevenness in wave optics and sub-scanning field curvature in a case where an optical face tangle error occurs on a deflection surface, so that a high definition image can be formed, and to provide an image forming apparatus using the optical scanning apparatus.

Hereinafter, exemplary embodiments of the present invention are described in detail with reference to the attached drawings. The optical scanning apparatus of the present invention includes a light source unit (which may be a semiconductor laser), and a deflection unit which deflects a beam for scanning from the light source unit to scan a surface to be scanned in a main scanning direction. Here, the main scanning direction is a direction in which the deflection surface rotates and a direction perpendicular to a rotation center axis of the deflection unit. Further, the main scanning direction is substantially parallel to a scanning line drawn on the surface to be scanned with the beam deflected by the deflection surface. The optical scanning apparatus of the present invention includes an incident optical system which images a focal line of the beam from the above-mentioned light source unit on the deflection surface of the deflection unit or a vicinity thereof, and an imaging optical system including a plurality of imaging lenses for forming an image of the beam deflected by the deflection surface on the surface to be scanned. First, the main scanning direction and the sub-scanning direction are perpendicular to an optical path of the beam that is emitted from the light source and passes through an optical axis of the incident optical system (which may be simply referred to as an optical axis of the incident optical system). The above description that the incident optical system forms the focal line means that the image of the light source is formed in this sub-scanning direction while the image of the light source is not formed in the main scanning direction (the beam remains to be a substantially collimated beam).

In the optical scanning apparatus of the present invention, at least one surface of the imaging lenses included in the imaging optical system has a fourth or higher order aspherical shape in the sub-scanning direction, and an aspherical amount changes in the main scanning direction. Thus, the field curvature in the sub-scanning direction is reduced. In addition, paraxial field curvature in the sub-scanning direction calculated by a paraxial amount in the sub-scanning direction is set to be an optimal value as expressed by the conditional expressions (1) and (2) described later. Thus, the pitch unevenness in wave optics is reduced.

First Embodiment

Figure 1:
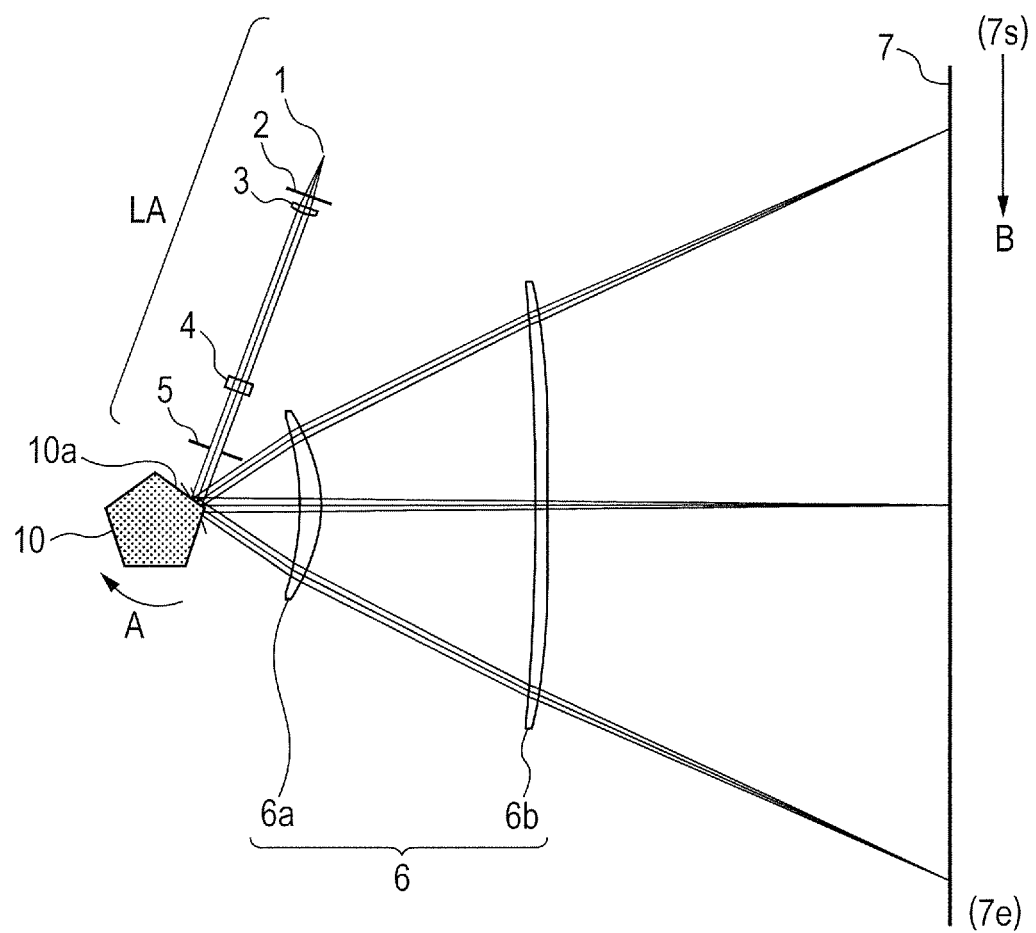
FIG. 1 is a main scanning sectional view of a first embodiment of the present invention.
Figure 2:
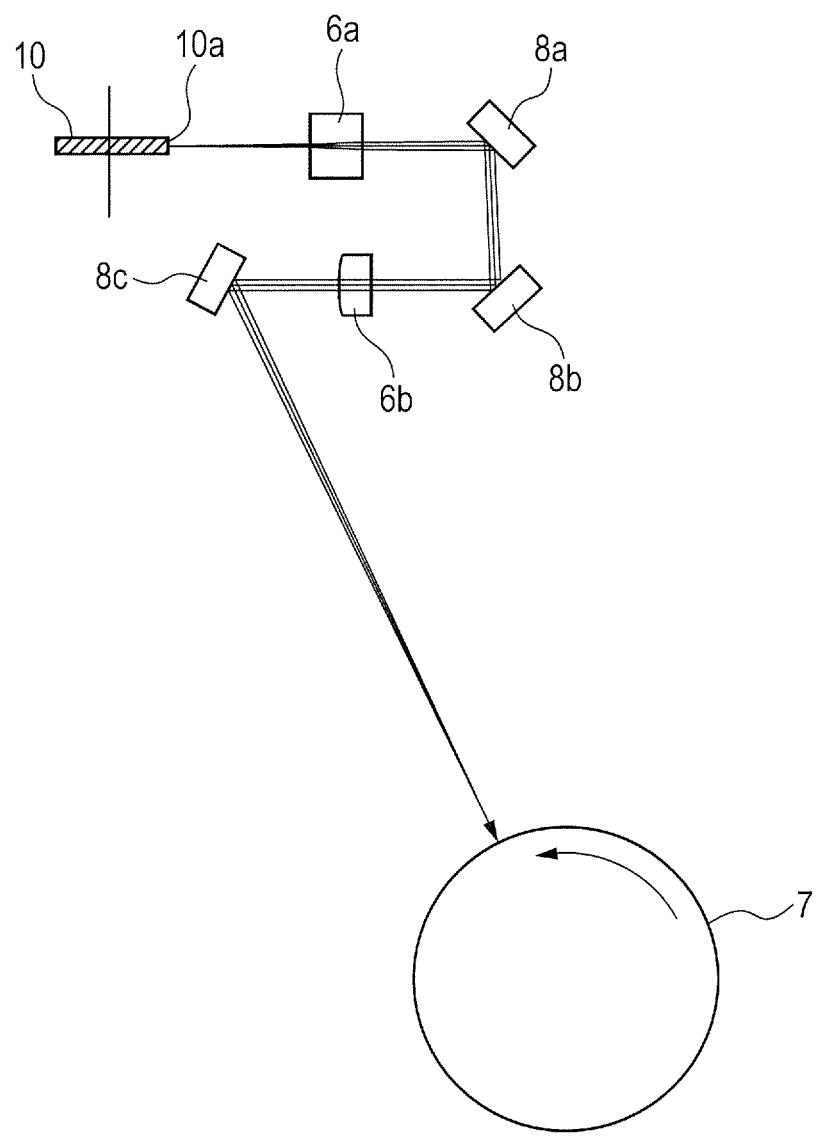
FIG. 2 is a sub-scanning sectional view of the first embodiment of the present invention.

FIG. 1 is a main portion sectional view of a main scanning direction (main scanning sectional view) illustrating an optical scanning apparatus according to a first embodiment of the present invention. FIG. 2 is a main portion sectional view of a sub-scanning direction (sub-scanning sectional view) illustrating a part of the optical scanning apparatus of FIG. 1 according to the first embodiment of the present invention.

Note that, in the following description, the main scanning direction means the direction perpendicular to a rotation axis of the rotational polygon mirror (deflection unit) and an optical axis of the imaging optical system (the direction in which the beam is reflected for deflection (deflected for scanning) by the rotational polygon mirror). The sub-scanning direction means the direction parallel to the rotation axis of the rotational polygon mirror. In addition, the main scanning section means a plane including the main scanning direction and the optical axis of the imaging optical system. In addition, the sub-scanning section means a cross section that includes the optical axis of the imaging optical system and is perpendicular to the main scanning section.

In the figure, a light source unit 1 includes a semiconductor laser (multibeam light source) including a plurality of light emitting points (light emitting portions). At least one of the plurality of light emitting points of the semiconductor laser 1 has a distance from the optical axis of a collimator lens (first optical unit) 3 described later, which is different from a distance from the optical axis of another one of the plurality of the light emitting points.

Figure 6:
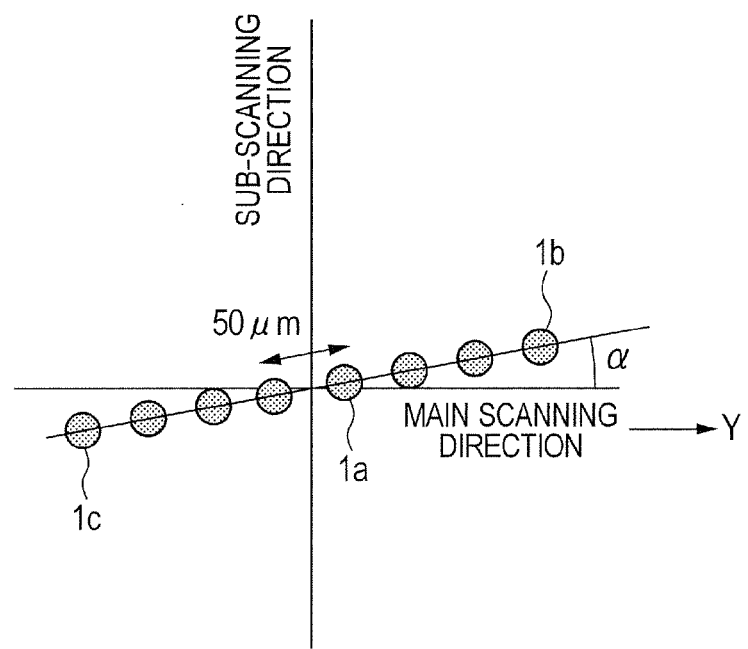
FIG. 6 is a schematic diagram illustrating a configuration of a light source according to the first embodiment and a fourth embodiment of the present invention.

In this embodiment, the light emitting points are arranged in a one-dimensional manner as illustrated in FIG. 6, and a semiconductor laser including eight light emitting points is used. In this embodiment, by using the eight beam laser, high-speed and high-definition image formation is achieved.

A first aperture stop 2 restricts a beam width of a passing beam in the sub-scanning direction so as to shape the beam from the light source unit 1. In this structure, the first aperture stop 2 is disposed in a vicinity of the collimator lens, and an exit pupil position in the sub-scanning direction is set in a vicinity of an imaging lens 6b. Then, principal rays of eight beams emitted from the eight light emitting points pass through the same position in the sub-scanning direction in a vicinity of the optical surface of the imaging lens 6b having a largest power in the imaging optical system.

The condensing lens 3 (hereinafter, referred to as a "collimator lens") constituting a part of the first optical unit is made of glass by a molding process. A surface of the collimator lens 3 on a deflection unit 10 side has a rotationally symmetric non-circular (aspheric) shape so as to reduce a spot diameter difference between the light emitting points described later, and to convert the diverging beam emitted from the light source unit 1 into a collimated beam or a substantially collimated beam.

A lens system 4 (hereinafter, referred to as a "cylindrical lens") constituting a part of the first optical unit has a power only in the sub-scanning section (sub-scanning direction). The cylindrical lens 4 forms a line image of the beam after passing through the collimator lens 3 on a deflection surface (reflection surface) 10a of the deflection unit 10 described later in the sub-scanning section. A second aperture stop 5 restricts a main scanning beam width of the passing beam from the cylindrical lens 4, so as to shape the beam.

The second aperture stop 5 in this embodiment is disposed on the deflection unit 10 side of the collimator lens 3. Note that, the collimator lens 3 and the cylindrical lens 4 may be formed of a single optical element.

In this embodiment, each of the first aperture stop 2, the collimator lens 3, the cylindrical lens 4, and the second aperture stop 5 constitutes an element of an incident optical system LA.

The collimator lens 3 has an aspheric surface shape in which a positive (convex) power (refractive power) is weakened from the lens optical axis toward the periphery as described later. Thus, condensing positions (focus positions) of the beams from the plurality of light emitting points on a surface 7 to be scanned or the deflection surface 10a become substantially the same so that spot diameters of the plurality of beams on the surface 7 to be scanned become substantially the same. In addition, the second aperture stop 5 disposed in a vicinity of the deflection unit 10 restricts a beam width in the main scanning direction and brings principal rays of the beams from the light emitting points close to each other on the deflection surface 10a, to thereby reduce vertical line fluctuation that occurs in a case where a multi-beam system is adopted.

The deflection unit 10 as a light deflector includes a polygon mirror (rotational polygon mirror) having five surfaces, and is rotated at a constant speed in the direction of the arrow A in the figure by a driving unit such as a motor (not shown).

An imaging optical system 6 (fθ lens system) having a condensing function and fθ characteristics includes a first imaging lens 6a and the second imaging lens 6b (fθ lenses). The first imaging lens 6a and the second imaging lens 6b both include an anamorphic lens having an aspheric surface shape in the main scanning section. The imaging optical system 6 forms, on a photosensitive drum surface 7 as the surface to be scanned, an image of the beam based on image information reflected and deflected by the deflection unit 10. Further, the imaging optical system 6 compensates the optical face tangle error on the deflection surface 10a of the deflection unit 10 by setting the deflection surface 10a and the photosensitive drum surface 7 to be conjugate to each other in the sub-scanning section.

An exit surface of the imaging lens 6b in this embodiment has a non-circular shape in the sub-scanning section, and the non-circular amount thereof is changed in the longitudinal direction (main scanning direction or Y direction) of the imaging lens 6b. Thus, a wavefront aberration amount in the sub-scanning direction is changed, so that the field curvature in the sub-scanning direction in wave optics is reduced. In addition, the paraxial field curvature of the imaging optical system 6 in the sub-scanning direction is generated appropriately. Thus, a gravity position shift of spot intensity in the sub-scanning direction on the surface 7 to be scanned in a case where the optical face tangle error occurs is reduced, and hence the pitch unevenness is reduced. The photosensitive drum surface 7 is the surface to be scanned.

In the optical scanning apparatus of this embodiment, the plurality of beams (eight beams in this embodiment) that are modulated in accordance with the image information and are emitted from the light source unit 1 are restricted in the beam width in the sub-scanning direction by the first aperture stop 2. Then, the collimator lens 3 converts the beams into collimated beams which enter the cylindrical lens 4. The beams entering the cylindrical lens 4 exit as it is in the main scanning section and are restricted in the beam width in the main scanning direction by the second aperture stop 5. In addition, in the sub-scanning section, the beams are converged to pass through the second aperture stop 5 (a beam width in the main scanning direction is restricted), and form the line image (longitudinal line image in the main scanning direction) on the deflection surface 10a of the deflection unit 10 or in a vicinity thereof.

Then, each of the plurality of beams reflected and deflected by the deflection surface 10a of the deflection unit 10 enters the imaging lens 6a having a positive (convex) power mainly in the main scanning direction. The beams are reflected by a plurality of folding mirrors (plane mirrors) 8a and 8b illustrated in FIG. 2 and enter the imaging lens 6b having a positive (convex) power mainly in the sub-scanning direction. The beams after passing through the imaging lens 6b are reflected by a folding mirror 8c and form a spot image on the photosensitive drum surface 7.

The deflection unit 10 is rotated in the direction of the arrow A, so that the photosensitive drum surface 7 is optically scanned at a constant speed in the direction of the arrow B (in the main scanning direction). Thus, a plurality of scanning lines are formed simultaneously on the photosensitive drum surface 7 as a recording medium, so that an image is recorded.

In this embodiment, the three plane mirrors 8a, 8b and 8c are used as illustrated in FIG. 2. Thus, the optical path of the imaging optical system 6 is folded to be compact, so that a width of the image forming apparatus (in a lateral direction in FIG. 2) is reduced.

As to the light emitting points of the light source unit (semiconductor laser) 1 of this embodiment, as illustrated in FIG. 6, eight beams are arranged in the one-dimensional manner with an inclination angle α of 9.2 degrees with respect to the main scanning direction (Y direction). A pitch between the light emitting points is 50 μm. Further, each of the light emitting points can be adjusted independently, and light emission intensity and timing are controlled by a laser driver (not shown). In addition, in order to adjust a beam interval error generated due to a mounting error at assembling of the laser light source, the light source unit is supported by the incident optical system LA so as to be pivotable about an axis parallel to the optical axis.

Note that, in FIG. 6, a light emitting point 1a is located on the axis (optical axis of the incident optical system LA) or in the vicinity of the axis, and a light emitting point 1b is located off the axis farthest in the main scanning direction.

In this embodiment, at least one optical surface of the imaging lenses included in the imaging optical system 6 has a non-circular shape in the sub-scanning section. Further, the non-circular amount of the non-circular shape changes in the main scanning direction. The paraxial field curvature in the sub-scanning direction of the beams forming images at the optical axis and the paraxial field curvature in the sub-scanning direction of the beams forming images at a maximum image height in an effective scanning range on the surface 7 to be scanned are expressed by ds(Y=0) and ds(Y=Ymax), respectively.

In this case, the following conditions are satisfied:

$$ds(Y=0)<0;$$

and $$ds(Y=Y\text{max})>0,$$

In this embodiment, a numerical value example of the imaging optical system 6 is shown in Table 1. In this embodiment, a shape of the imaging lens 6a has an origin that is an intersection point between the imaging lens and the optical axis. Further, as illustrated in FIG. 1, it is supposed that on a scanning start side 7s and on a scanning end side 7e on the optical axis, the optical axis is an X axis, a direction perpendicular to the optical axis in the main scanning section is a Y axis, and a direction perpendicular to the optical axis in the sub-scanning section is a Z axis, which are expressed by the following functions.

Scanning Start Side $$x = \frac{\frac{y^2}{R}}{1+\sqrt{1-(1+K)(y/R)^2}} + B_{4s}y^4 + B_{6s}y^6 + B_{8s}y^8 + B_{10s}y^{10} \quad (a)$$

Scanning End Side $$x = \frac{\frac{y^2}{R}}{1+\sqrt{1-(1+K)(y/R)^2}} + B_{4e}y^4 + B_{6e}y^6 + B_{8e}y^8 + B_{10e}y^{10} \quad (b)$$

where R denotes the curvature radius of the lens surface, and K, $B_4$, $B_6$, $B_8$, and $B_{10}$ denote aspherical coefficients. In this embodiment, the shapes in the main scanning direction (Y direction) are formed symmetrically with respect to the optical axis (X axis). In other words, aspherical coefficients on the scanning start side and on the scanning end side are made to be the same. In addition, both an incident surface and an exit surface of the imaging lens 6a have a circular sectional shape in the sub-scanning direction. The exit surface of the imaging lens 6b has a non-circular sectional shape including a fourth order term of Z in the sub-scanning direction, and the non-circular amount thereof changes in the longitudinal direction (Y direction).

Further, a shape of the imaging lens 6b in the sub-scanning direction continuously varies in an effective range of the lens, in which a curvature 1/r in the sub-scanning section (surface that includes the optical axis and is perpendicular to the main scanning section) of the incident surface and a fourth order aspherical coefficient are functions of Y on the scanning start side 7s and on the scanning end side 7e with respect to the optical axis. The shape of the imaging lens 6b in the sub-scanning direction can be expressed by the following continuous function using the above-mentioned coordinate system on the scanning start side and on the scanning end side with respect to the optical axis.

Functions in the Sub-Scanning Direction of r1, r2, and r3 Surfaces $$S = \frac{\frac{z^2}{r'}}{1+\sqrt{1-(z/r')^2}}$$

$$r' = r(1 + D_{2s}y^2 + D_{4s}y^4 + D_{6s}y^6 + D_{8s}y^8 + D_{10s}y^{10})$$

$$S = \frac{\frac{z^2}{r'}}{1+\sqrt{1-(z/r')^2}}$$

$$r' = r(1 + D_{2e}y^2 + D_{4e}y^4 + D_{6e}y^6 + D_{8e}y^8 + D_{10e}y^{10})$$

Function in the Sub-Scanning Direction of r4 Surface $$x = \frac{\frac{z^2}{r'}}{1+\sqrt{1-(z/r')^2}} + \sum_{i=0}^{10} M_i y^i Z^4$$

$$r' = 1 \Big/ \left(1/r + \sum_{j=2}^{10} D_j y^j\right)$$

r' represents a curvature radius in the sub-scanning direction, Dj represents a curvature variation coefficient, and Mi represents a sagittal line aspherical coefficient.

In a case where the coefficient is different between a positive side and a negative side of Y, the suffix s indicates the scanning start side, and the suffix e indicates the scanning end side. In addition, the curvature radius in the sub-scanning direction means a curvature radius in the cross section perpendicular to the shape (meridional line) in the main scanning direction.

A method of reducing pitch unevenness on design according to the present invention is described using a comparative example of FIGS. 3A to 3E. The polygon mirror as the deflection unit 10 has an error called an optical face tangle error in which an angle of the reflection surface in the sub-scanning direction is shifted from a desired value (design value) due to a process error of polygon surfaces or an assembly error.

Figure 3A:
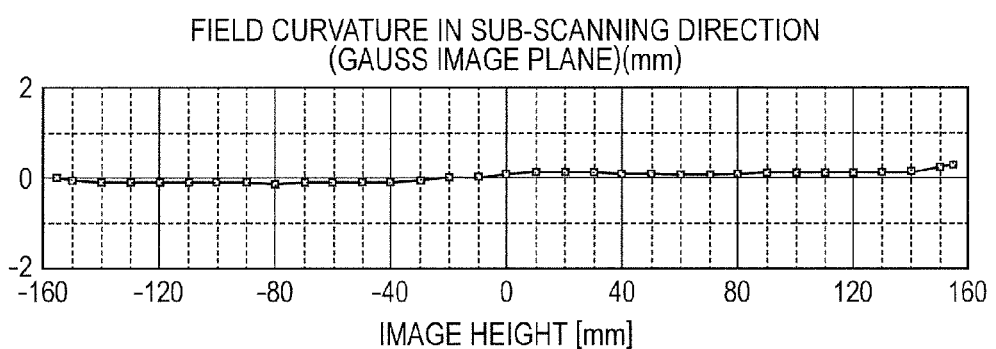
FIG. 3A is an explanatory graph showing an optical performance of Gauss image plane as a comparative example according to the first embodiment of the present invention.

As shown in FIG. 3A, a usual optical scanning apparatus is designed so that the imaging position in the sub-scanning direction (paraxial image plane=Gauss image plane) is substantially the same as the surface to be scanned. In other words, the imaging relationship of the imaging optical system in the sub-scanning direction is such that the focal line image formed in a vicinity of the deflection surface and the surface to be scanned are conjugate.

Figure 3B:
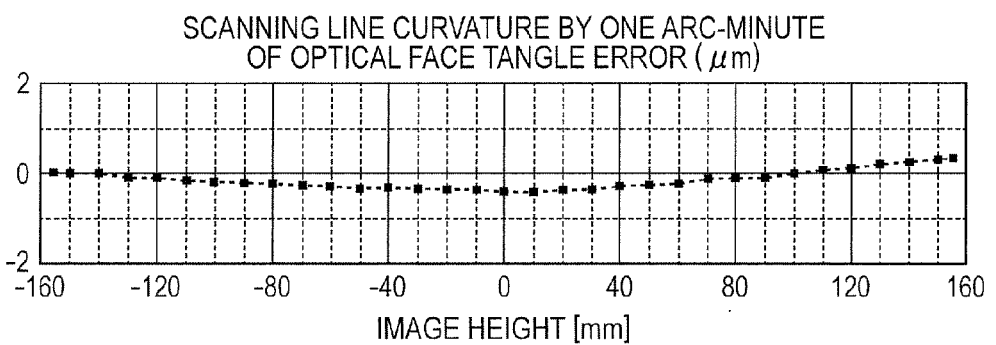
FIG. 3B is an explanatory graph showing an optical performance of Gauss image plane as the comparative example according to the first embodiment of the present invention.
Figure 3C:
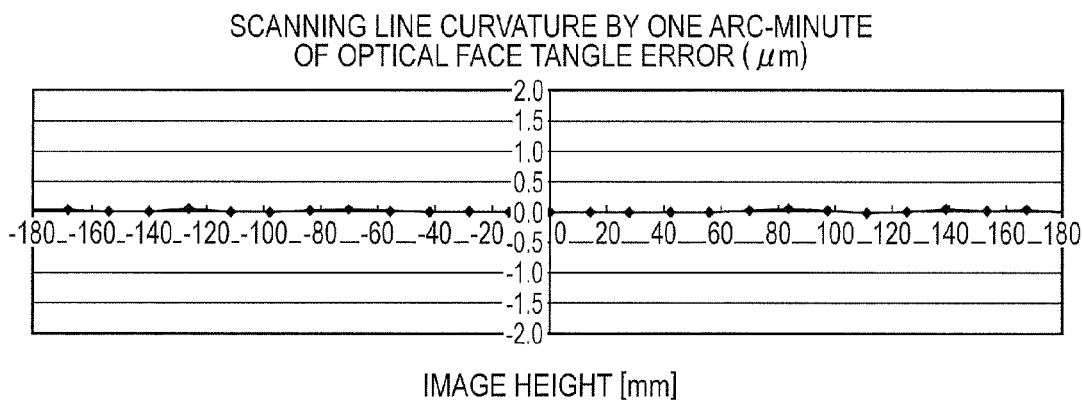
FIG. 3C is an explanatory graph showing an optical performance of Gauss image plane as the comparative example according to the first embodiment of the present invention.
Figure 3D:
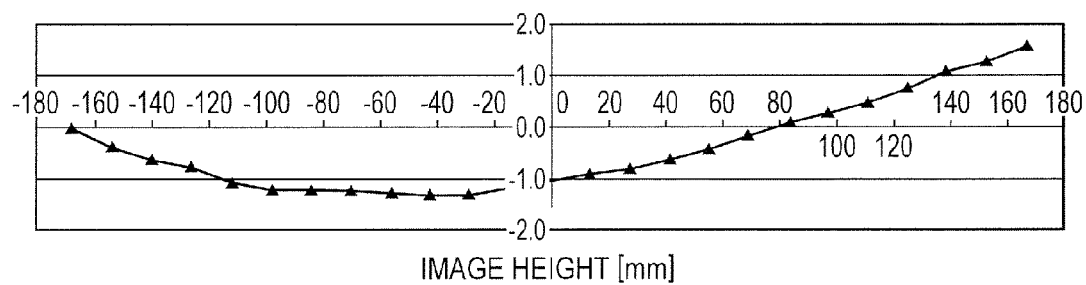
FIG. 3D is an explanatory graph showing an optical performance of Gauss image plane as the comparative example according to the first embodiment of the present invention.

In this conventional structure, if the optical face tangle error occurs, a beam reach position in the sub-scanning direction on the surface to be scanned is shifted because of a sag (bumps and dips) that is a displacement of the deflection surface in the optical axis direction due to scanning. As a result, pitch unevenness is generated because of the so-called optical face tangle error (FIG. 3B). However, in the present invention, the curvature radius of the imaging lens 6b in the sub-scanning direction is set to an optimal value, so that the paraxial image plane in the sub-scanning direction is curved (FIG. 3C). Thus, even if the optical face tangle error is generated, the spot gravity position in the sub-scanning direction is not shifted (FIG. 3D).

Figure 3E:
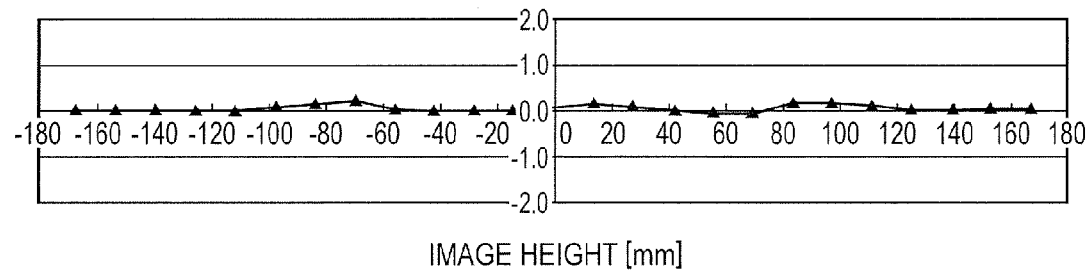
FIG. 3E is an explanatory graph showing an optical performance of Gauss image plane as the comparative example according to the first embodiment of the present invention.

In the present invention, in a case where the deflection surface 10a is inclined by three arc-minute in the sub-scanning direction, a shift of the intensity gravity position of the beam spot is within ±2 μm in the sub-scanning direction on the surface to be scanned. In addition, the field curvature in the sub-scanning direction is reduced by the same method as in the conventional example. In other words, a fourth order aspherical surface is introduced in the sub-scanning direction, so that a wavefront aberration in the sub-scanning direction is reduced. Thus, the image plane position in wave optics is agreed with the surface to be scanned while the paraxial image plane remains curved (FIG. 3E). Here, the paraxial image plane means an image plane position determined by geometrical optics from a shape in a vicinity of the optical axis of the imaging lens, and the image plane position in wave optics means an image plane position at which the wavefront aberration becomes smallest.

Figure 4A:
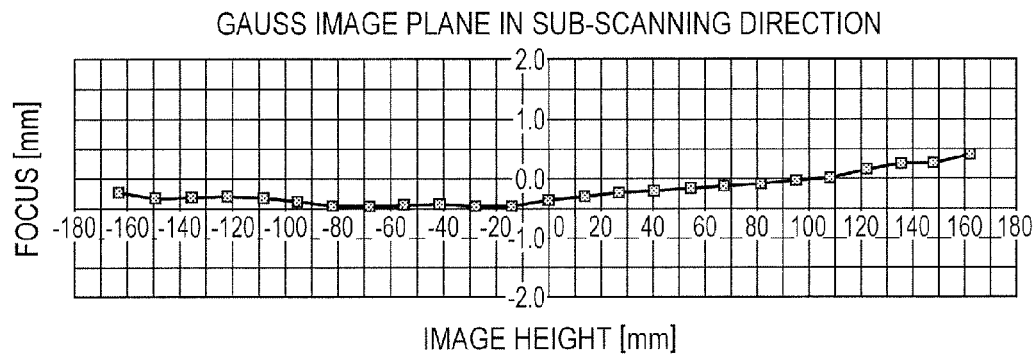
FIG. 4A is an explanatory graph showing an optical performance according to the first embodiment of the present invention.
Figure 4B:
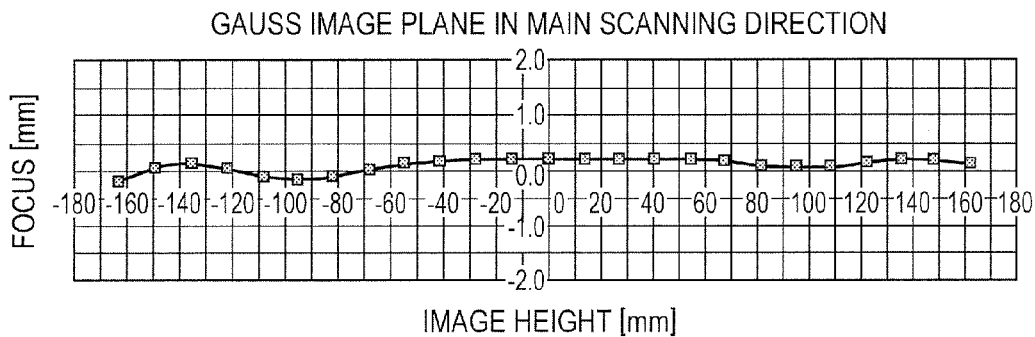
FIG. 4B is an explanatory graph showing an optical performance according to the first embodiment of the present invention.

FIGS. 4A to 4C and 5 show optical performances of the present invention. FIG. 4A shows a paraxial image plane in the sub-scanning direction (Gauss image plane). FIG. 4B shows a paraxial image plane in the main scanning direction. As described above, the curvature radius in the sub-scanning direction is set so as to satisfy the following conditional expressions:

$$ds(Y=0)<0 \tag{1}$$

$$ds(Y=Y\max)>0 \tag{2}$$

Further, as to the conjugate relationship in the sub-scanning direction, instead of being conjugate with the deflection surface in the entire image height, at least axial and off-axial conjugate relationships are set between the deflection surface and the focal line imaging position.

Figure 4C:
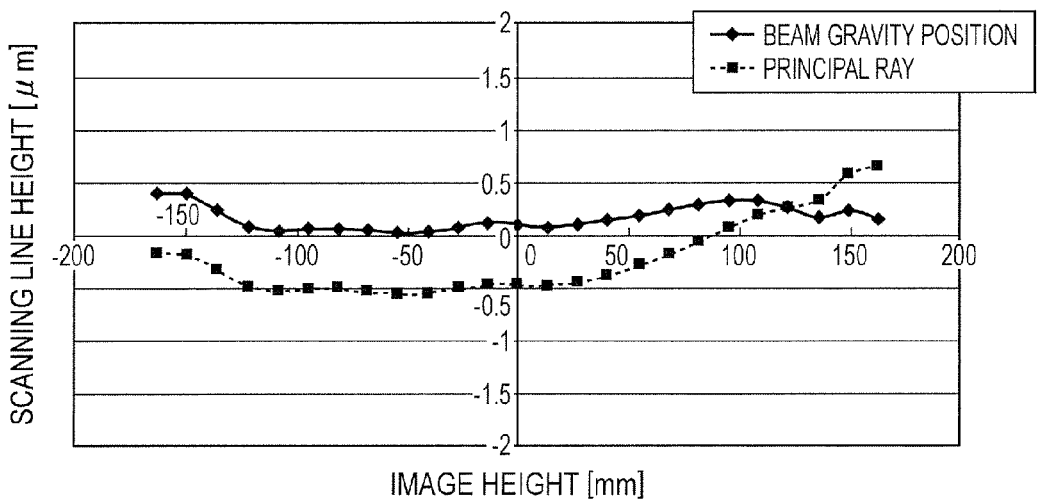
FIG. 4C is an explanatory graph showing an optical performance according to the first embodiment of the present invention.

Thus, as shown in FIG. 4C, even if the optical face tangle error is generated, the shift of the sub-scanning spot gravity position (solid line in the figure) on the surface 7 to be scanned is reduced, so that the pitch unevenness can be reduced. In addition, in order to reduce the variation of the spot diameter in the sub-scanning direction on the surface 7 to be scanned, the exit surface of the imaging lens 6b is constituted of a sub-scanning non-circular surface as described above. Further, the non-circular amount thereof is changed in the main scanning direction so that the wavefront aberration in the sub-scanning direction is reduced, and hence the field curvature in wave optics is reduced.

In addition, the scanning line curvature shown in FIG. 4C with broken line indicates a reach position of the principal ray in the imaging optical system 6. The conventional design is to reduce a curvature amount of the principal ray reaching the surface to be scanned. However, the inventor of the present invention found the following fact. The conventional design method can reduce the reach position of the principal ray, but the spot gravity position in the sub-scanning direction is shifted. Therefore, if the optical face tangle error is generated, the pitch unevenness on the surface to be scanned cannot be reduced.

Figure 14:
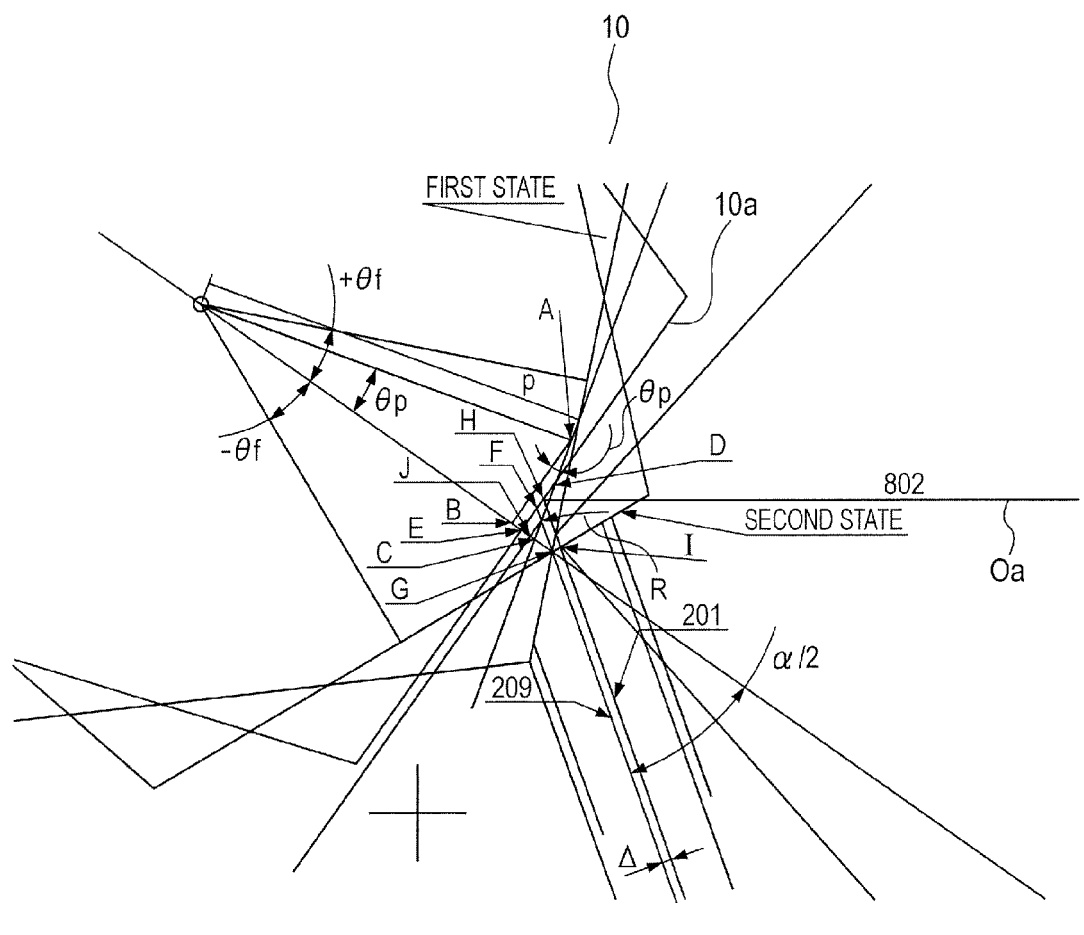
FIG. 14 is an enlarged schematic diagram of a vicinity of a deflecting reflection surface.

Hereinafter, deriving of the above-mentioned conditional expressions (1) and (2) is described with reference to FIG. 14. A state of the deflection surface 10a in a case of being directed to the end 7s of the surface 7 to be scanned on the opposite side to the light source unit 1 with respect to an optical axis Oa of the imaging optical system 6 is regarded as a first state (or a second state), while a state of the deflection surface in a case of being directed to an end of the surface to be scanned on the light source unit side is regarded as the second state (or the first state). An intersection point between the deflection surface 10a in the first state A1 and the same in the second state A2 is referred to as a cross point (100 percent cross point) G.

A vertical distance between the cross point G and a principal ray 201 of the beam after passing through the collimator lens is represented by Δ (mm). An incident angle of the beam entering the deflection unit 10 is represented by α (degrees). An optical face tangle error angle of the deflection unit 10 is represented by φ (degrees). A lateral zooming factor of the imaging optical system 6 in the sub-scanning direction is represented by βs. A radius of a circumscribed circle of the deflection unit 10 is represented by r (mm). The number of the deflection surfaces 10a of the deflection unit 10 is represented by M, and a rotation angle of the deflection surface 10a of the deflection unit 10 in a case where the beam reflected and deflected by the deflection unit 10 is directed to both ends of the surface 7 to be scanned is represented by $\theta_f$ (degrees).

A rotation angle of the deflection unit 10 is represented by $\theta_p$ $(-\theta_f \leq \Theta_p \leq \theta_f)$ (degrees). A movement amount IH(l) (mm) of the deflection surface 10a in the principal ray direction of the beam after passing through the collimator lens in the x-y surface (main scanning section) due to rotation of the deflection unit 10 is as follows.

When $$P = r\cos\left(\frac{\pi}{M}\right),$$

the following equation:

$$DE = P\left(\frac{1-\cos(\theta_p)}{\sin(\theta_p)}\right) \tag{Equation A}$$

holds because of the similarity between ΔABC and ΔCDE.

Further, when $$EG = r\cos\left(\frac{\pi}{M} - |\theta_f|\right) - r\sin\left(\frac{\pi}{M} - |\theta_f|\right)\tan(|\theta_f|),$$

the following equation:

$$GK = \frac{s - P\left(\frac{1-\cos(\theta_p)}{\cos(\theta_p)}\right)}{\cos\left(\frac{\alpha}{2}\right) - \sin\left(\left(\frac{\alpha}{2}\right)\tan(\theta_p)\right)} = \tag{Equation B}$$

$$\frac{r\cos\left(\frac{\pi}{M} - |\theta_f|\right) - r\sin\left(\frac{\pi}{M} - |\theta_f|\right)\tan(|\theta_f|) - r\cos\left(\frac{\pi}{M}\right)\left(\frac{1-\cos(\theta_p)}{\cos(\theta_p)}\right)}{\cos\left(\frac{\alpha}{2}\right) - \sin\left(\left(\frac{\alpha}{2}\right)\tan(|\theta_p|)\right)}$$

is obtained because of the similarity between ΔCDE and ΔCKJ.

Equation B indicates a sag amount of the beam passing through the 100 percent cross point G (Δ=0). A sag amount IH of the beam that does not pass through the 100 percent cross point G can be calculated by the following equation:

$$IH = GK + \Delta \times \tan\left(\frac{\alpha}{2} + \theta_p\right) - \Delta \times \tan\left(\frac{\alpha}{2} + \theta_f\right) \tag{Equation C}$$

$$= \frac{r\cos\left(\frac{\pi}{M} - |\theta_f|\right) - r\sin\left(\frac{\pi}{M} - |\theta_f|\right)\tan(|\theta_f|) - r\cos\left(\frac{\pi}{M}\right)\left(\frac{1-\cos(\theta_p)}{\cos(\theta_p)}\right)}{\cos\left(\frac{\alpha}{2}\right) - \sin\left(\left(\frac{\alpha}{2}\right)\tan(\theta_p) + \Delta \times \tan\left(\frac{\alpha}{2} + \theta_p\right) - \Delta \times \tan\left(\frac{\alpha}{2} + \theta_f\right)\right)}.$$

In Equation C, a difference between the maximum value and the minimum value of IH in $-\theta_f \leq \Theta_p \leq \theta_f$ is defined as a sag amount of the deflecting reflection surface, and hence δ=max (IH)−min(IH) is obtained.

The conditional expressions are conditional expressions for defining the Gauss image plane position in the sub-scanning direction.

In this embodiment, as shown in Table 1, the values are as follows:
r=17,
M=5,
$\theta_f$=17.16, and
α=70.
In addition,
Δ=0.81,
β=−1.204, and
δ=1.11,
the following values are derived:

$$0.2\delta\beta^2 = 0.32,$$

and $$0.8\delta\beta^2 = 1.29.$$

As shown in FIG. 4A, the axial and off-axial Gauss image planes ds(Y=0)=−0.392 and ds(Ymax=163)=0.38 in the sub-scanning direction satisfy the conditional expressions ds(Y=0)<0 and ds(Y=Ymax)>0, and also satisfy the following conditional expressions:

$$0.2\delta\beta^2 < |ds(Y=0)| < 0.8\delta\beta^2;$$

and $$0.2\delta\beta^2 < |ds(Y=Y\text{max})| < 0.8\delta\beta^2.$$

Figure 5:
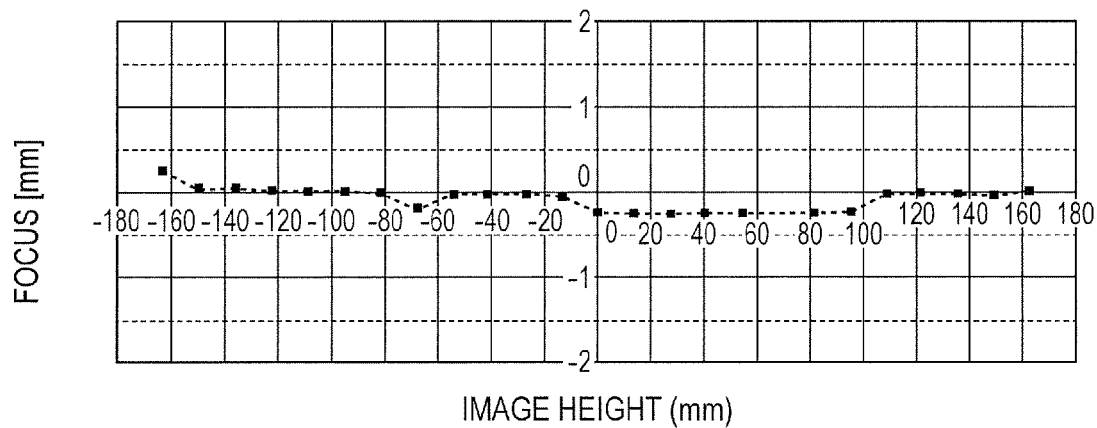
FIG. 5 is an explanatory graph showing an optical performance of a wave optics image plane according to the first embodiment of the present invention.

Note that, in this embodiment, in order to effectively use the reflection surface 10a of the deflection unit 10, Δ=0.81 is set. The image plane position in the sub-scanning direction (focus in sub-scanning direction) in wave optics in this embodiment is shown in FIG. 5. FIG. 5 shows a position at which the wavefront aberration amount in the sub-scanning direction becomes smallest. In general, the position does not coincide with the position of the sub-scanning Gauss image plane shown in FIG. 4A due to an influence of spherical aberration or the like.

In this embodiment, the Gauss image plane in the sub-scanning direction is curved by 1 mm so as to satisfy the conditional expressions, but the image plane in wave optics is controlled to have a field curvature of 0.5 mm. Because the surface to be scanned is disposed at a position at which the wavefront aberration shown in FIG. 5 is smallest, a shift amount of the focus in the sub-scanning direction on the surface to be scanned in this embodiment is controlled to be within ±0.25 mm. In this embodiment, in order to set the curvature amount of the image plane in wave optics smaller than the curvature amount of the Gauss image plane, the aspherical amount of the imaging lens 6b in the sub-scanning direction is continuously changed (monotonously changed) in the longitudinal direction.

Hereinafter, a method of reducing a deterioration of pitch unevenness due to the wavelength variation of the beam emitted from the light source unit 1 is described. In an optical scanning apparatus using a vertical cavity surface emitting laser (VCSEL) as the light source unit, the thickness of a wafer as a material is varied in a laser manufacturing process.

Then, the wavelength of the beam emitted from the laser is varied. In this case, it is necessary to design the imaging optical system taking a variation of an oscillation wavelength into account. Because the thickness variation in the same wafer can be controlled to be small in the manufacturing process of the element, the oscillation wavelength variation among a plurality of beams of the same laser element is as small as 1.5 nm, for example. However, it is known that the oscillation wavelength variation between laser elements manufactured from different wafers is approximately 5 to 10 nm, for example.

In general, in order to reduce the pitch unevenness generated when the wavelength changes, axial chromatic aberration of the imaging optical system in the sub-scanning direction should be reduced. However, in order to reduce the axial chromatic aberration of the imaging optical system in the sub-scanning direction, it is necessary to use a plurality of glass lenses or to use a diffractive optical element, which causes a difficulty in the manufacturing process.

Therefore, in this embodiment, the conjugate point position shift due to the wavelength variation is measured when the optical scanning apparatus is assembled, and means for changing the optical path length between the deflection surface and the surface to be scanned is used. Table 1 shows the aspherical coefficient of the imaging optical system of this embodiment.

TABLE 1

| | |
|---|---|
| Operating wavelength (mm) | 6.70E−07 |
| Refractive index of imaging optical system | 1.527275 |
| Number of surfaces of deflection unit | 5 |
| Radius of circumscribed circle of deflection unit (mm) | 34 |
| Rotation angle of deflection unit (±deg.) | 17.16 |
| Incident angle in main scanning direction (deg.) | 70 |
| Incident angle in sub-scanning direction (deg.) | 0 |
| Axial deflection point to incident surface of first imaging lens (mm) | 4.50E+01 |
| Focal length of imaging lens (mm) | 2.72E+02 |

| Rotation center coordinates of deflection unit | | |
|---|---|---|
| | X | −12.19 |
| | Y | −6.57 |

| | R1 surface | | R2 surface | |
|---|---|---|---|---|
| | Scanning start side (s) | Scanning end side (e) | Scanning start side (s) | Scanning end side (e) |
| Main scanning section | d   9.00E+00 | | d   9.230E+01 | |
| | R  −1.05E+02 | | R  −6.00E+01 | |
| | K  −1.81E+01 | K  −1.81E+01 | K  −9.28E−01 | K  −9.28E−01 |
| | B4 −2.24E−06 | B4 −2.24E−06 | B4 −4.71E−07 | B4 −4.71E−07 |
| | B6  1.84E−09 | B6  1.84E−09 | B6  1.49E−10 | B6  1.49E−10 |
| | B8 −5.98E−13 | B8 −5.98E−13 | B8  3.20E−13 | B8  3.20E−13 |
| | B10 6.36E−17 | B10 6.36E−17 | B10 −1.16E−16 | B10 −1.16E−16 |

TABLE 1-continued

| | | | | | | | | |
|---|---|---|---|---|---|---|---|---|
| Sub-scanning section | r | −1.00E+03 | | | r | −1.00E+03 | | |
| | D2 | 0.00E+00 | D2 | 0.00E+00 | D2 | 0.00E+00 | D2 | 0.00E+00 |
| | D4 | 0.00E+00 | D4 | 0.00E+00 | D4 | 0.00E+00 | D4 | 0.00E+00 |
| | D6 | 0.00E+00 | D6 | 0.00E+00 | D6 | 0.00E+00 | D6 | 0.00E+00 |
| | D8 | 0.00E+00 | D8 | 0.00E+00 | D8 | 0.00E+00 | D8 | 0.00E+00 |
| | D10 | 0.00E+00 | D10 | 0.00E+00 | D10 | 0.00E+00 | D10 | 0.00E+00 |

| | R3 surface | | | | R4 surface | | | |
|---|---|---|---|---|---|---|---|---|
| | Scanning start side (s) | | Scanning end side (e) | | Scanning start side (s) | | Scanning end side (e) | |
| Main scanning section | d | 5.00E+00 | | | d | 1.75E+02 | | |
| | R | −1.00E+03 | | | R | −2.79E+26 | | |
| | K | 0.00E+00 | K | 0.00E+00 | K | −1.99E+06 | K | −1.99E+06 |
| | B4 | 0.00E+00 | B4 | 0.00E+00 | B4 | −1.09E−07 | B4 | −1.09E−07 |
| | B6 | 0.00E+00 | B6 | 0.00E+00 | B6 | 4.59E−12 | B6 | 4.59E−12 |
| | B8 | 0.00E+00 | B8 | 0.00E+00 | B8 | −1.82E−16 | B8 | −1.82E−16 |
| | B10 | 0.00E+00 | B10 | 0.00E+00 | B10 | 4.23E−21 | B10 | 4.23E−21 |
| Sub-scanning section | r | 1.67E+02 | | | r | −5.58E+01 | | |
| | D2 | 1.33E−04 | D2 | −1.76E−04 | D2 | 2.60E−08 | D2 | 1.84E−06 |
| | D4 | −1.71E−08 | D4 | 5.64E−08 | D4 | 1.27E−10 | D4 | −2.89E−10 |
| | D6 | −6.75E−12 | D6 | −1.09E−11 | D6 | −1.37E−14 | D6 | 2.95E−14 |
| | D8 | 1.21E−15 | D8 | 9.15E−16 | D8 | 2.23E−18 | D8 | 5.35E−19 |
| | D10 | −5.40E−20 | D10 | −2.79E−20 | D10 | −1.33E−22 | D10 | −9.04E−23 |
| | M0 | 0.00E+00 | | | M0 | 3.03E−06 | | |
| | M1 | 0.00E+00 | | | M1 | −1.26E−08 | | |
| | M2 | 0.00E+00 | | | M2 | −3.67E−10 | | |
| | M3 | 0.00E+00 | | | M3 | −5.83E−13 | | |
| | M4 | 0.00E+00 | | | M4 | 1.68E−14 | | |

| Incident optical system | | | |
|---|---|---|---|
| | r | d | N (670 nm) |
| Light source (light emitting point) | 0.0000 | 18.4570 | 0.0000 |
| Aperture stop in sub-scanning direction | | 4.0000 | |
| Collimator lens* | 100.0000 | 2.8000 | 1.5796 |
| | −16.6988 | 76.0000 | 0.0000 |
| Cylindrical lens | 0.0000 | 5.0000 | 1.7670 |
| | 0.0000 | 28.5000 | 1.0000 |
| Aperture stop in main scanning direction (2.72 mm) | | 25.0000 | |
| Deflection surface | 0.0000 | 0.0000 | 1.0000 |

| Aspherical coefficient | |
|---|---|
| A | 0.00E+00 |
| B | 2.31E−05 |
| C | 6.13E−08 |
| D | 0.00E+00 |
| E | 0.00E+00 |
| F | 0.00E+00 |
| G | 0.00E+00 |

*aspherical surface

Here, "E−x" means "$10^{-x}$". R1 surface is a surface of the imaging lens 6a on the side of the light deflecting device 10. R2 surface is a surface of the imaging lens 6a on the side of the surface 7 to be scanned. R3 surface is a surface of the imaging lens 6b on the side of the light deflecting device 10. R4 surface is a surface of the imaging lens 6b on the side of the surface 7 to be scanned.

As described above, the incident surface of the imaging lens 6b has a circular shape both in the meridional line direction (main scanning direction) and in the sagittal line direction (sub-scanning direction), and is constituted of a refraction surface whose curvature of the sagittal line changes continuously in the main scanning direction.

In addition, the exit surface of the imaging lens 6b has a non-circular shape in both the meridional line direction and the sagittal line direction, and has a refraction surface whose non-circular amount (aspherical amount) of the curvature of the sagittal line changes continuously in the main scanning direction. In a case where the aspherical amount in the sagittal line direction changes in the meridional line direction, the field curvature in the sub-scanning direction in wave optics is compensated as described above. In addition, by forming the non-circular surface in the sagittal line direction on the imaging lens (optical surface of 6b) in which the beam enters with a largest beam width in the sub-scanning direction in the imaging optical system 6, the aspheric effect is enhanced so that the wavefront aberration can be easily compensated.

Further, by using the optical surface having a non-circular surface in the sub-scanning direction for the imaging lens 6b in which the beam enters with a smallest beam width in the main scanning direction, a spot shape deterioration on the surface to be scanned is reduced.

Figure 7A:
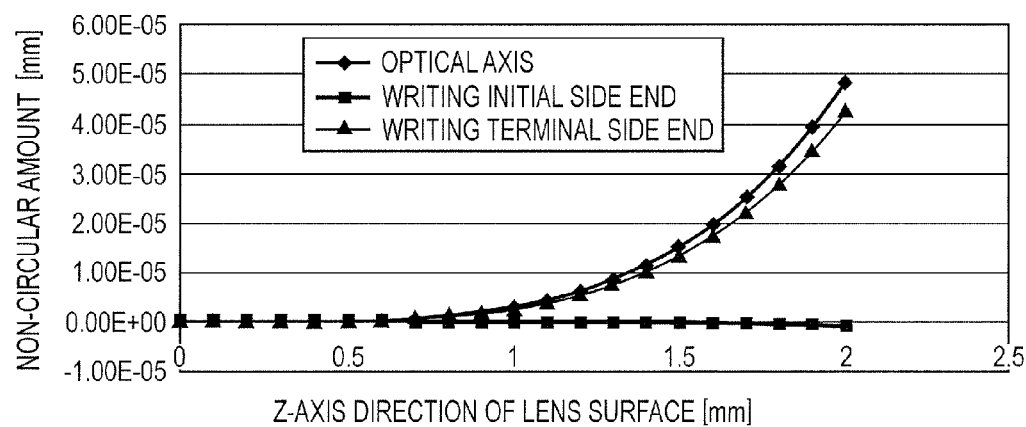
FIG. 7A is a graph showing a sub-scanning non-circular amount according to the first embodiment of the present invention.
Figure 7B:
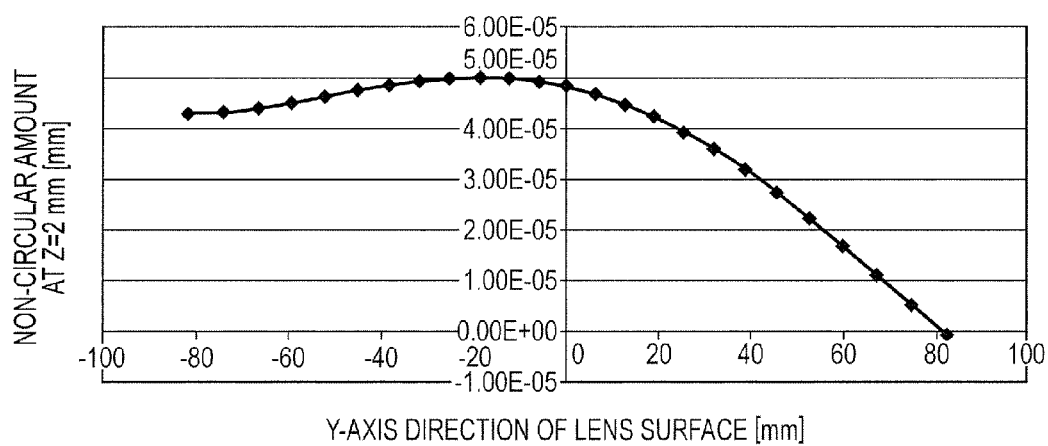
FIG. 7B is a graph showing a sub-scanning non-circular amount according to the first embodiment of the present invention.

FIGS. 7A and 7B show non-circular amounts of the non-circular surface according to this embodiment. FIG. 7A shows a non-circular amount in the sub-scanning direction of the exit surface of the lens 6b illustrated in FIG. 1. Because a beam width in the sub-scanning direction is 4 mm in this embodiment, positions of Z=±2 mm are positions at which marginal rays in the sub-scanning direction pass (sub-scanning beam edges).

In the figure, the horizontal axis represents the sub-scanning direction Z on the lens surface, and the sagittal line non-circular amount changes continuously from a vicinity of the optical axis at Z=0 in the sub-scanning direction to the sub-scanning beam edge at Z=2. In addition, the non-circular amount in a vicinity of the optical axis and a writing terminal side end is larger than the non-circular amount on the writing initial side (an effective end on the positive side in the Y coordinate), and hence both the pitch unevenness reduction and the image plane position compensation in wave optics are achieved.

FIG. 7B shows a change in the main scanning direction of the non-circular amount at the beam edge in the sub-scanning direction. The non-circular amount of the exit surface of the lens 6b becomes 50 nm at most in a vicinity of the optical axis (lens coordinate Y=−20 mm) of the lens and is monotonously decreased toward the end of the lens in the longitudinal (Y) direction. A non-circular amount at an image height on the writing initial side (Y positive) is smaller than that in a vicinity of the image center and the writing terminal side (Y negative).

The writing initial side and the writing terminal side are asymmetric with respect to the optical axis in order to compensate an influence of the sag on the deflection surface. In addition, the non-circular amount has a positive value in substantially the entire region in order to compensate spherical aberration in the sub-scanning direction.

Figure 8:
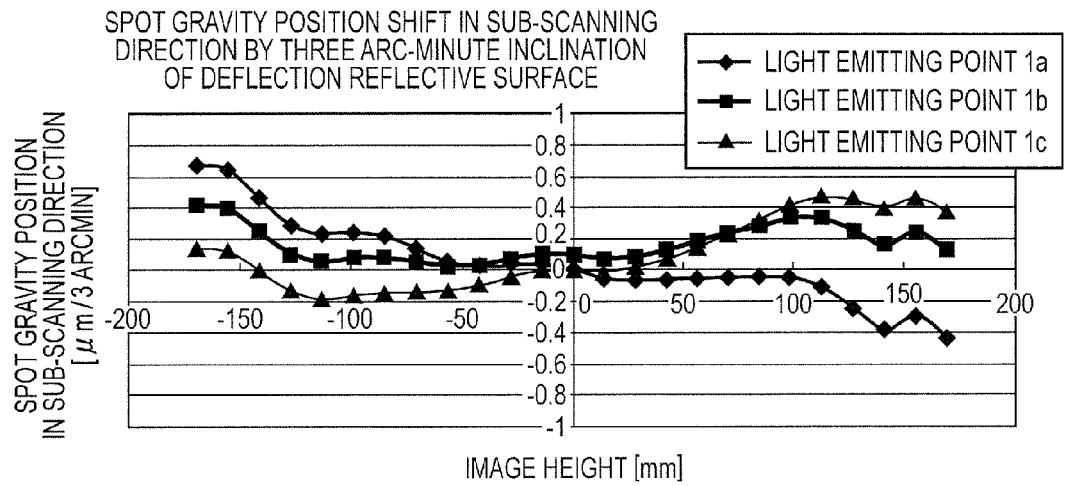
FIG. 8 is a main scanning sectional view illustrating a spot position in a case where an optical face tangle error occurs according to the first embodiment of the present invention.

FIG. 8 shows optical face tangle error performance for the beams emitted from the light emitting points 1a, 1b, and 1c according to this embodiment. In the figure, the horizontal axis represents the image height, and the vertical axis represents the spot gravity position shift in the sub-scanning direction on the surface to be scanned in a case where the deflection surface is inclined by three arc-minute. In this embodiment, even if the deflection surface is inclined by three arc-minute, the gravity position shift of 0.7 µm or smaller, namely within ±2 µm is achieved in the entire region of the surface to be scanned for all the beams including the light emitting points 1a to 1c.

In this embodiment, the non-circular surface is formed on the exit surface of the lens 6b. However, if the non-circular surface is formed on the incident surface of the lens 6b, the same performance as in this embodiment can be secured by reversing the sign of the non-circular amount.

As described above, in this embodiment, the non-circular amount in the sub-scanning beam edge is 500 nm or smaller so as to be advantageous in manufacturing the lens. The non-circular amount at the beam edge in the sub-scanning direction is represented by δP0, and the non-circular amount at the beam edge in the sub-scanning direction at the effective end in the main scanning direction is represented by δP1. In this case, |δP0|>|δP1| is satisfied, so as to perform reduction of the pitch unevenness and compensation of the image plane position in wave optics.

The non-circular shape in the sub-scanning direction of this embodiment is constituted of only the fourth order term of Z in the equation of the aspherical shape described later, but a sixth or higher order non-circular surface may be used. In addition, in the imaging optical system 6 of this embodiment, the imaging lenses 6a and 6b are formed of a transparent plastic lens having a power. Thus, the imaging lens can be manufactured easily, and flexibility in design is improved by using an aspheric surface.

In addition, the imaging lens 6a having a power mainly in the main scanning direction may be made of a glass material. In a case where a glass material is used, it becomes easy to obtain an optical scanning apparatus superior in optical performance in the main scanning direction and environmental characteristics. In addition, the imaging optical system 6 is constituted of two imaging lenses in this embodiment, but the present invention is not limited thereto. The same effect as in the embodiment described above may be obtained even in a case where the imaging optical system 6 is constituted of one imaging lens or three or more imaging lenses. In addition, Table 1 shows values of individual members constituting the optical scanning apparatus according to the first embodiment of the present invention.

As described above, by setting the curvature radius in the sub-scanning direction and the non-circular amount in the sub-scanning direction of the imaging lens appropriately, the sub-scanning spot gravity position shift due to the optical face tangle error can be reduced. Thus, it is possible to provide the optical scanning apparatus and the image forming apparatus using the same, which can form a high definition image.

Second Embodiment

Figure 9:
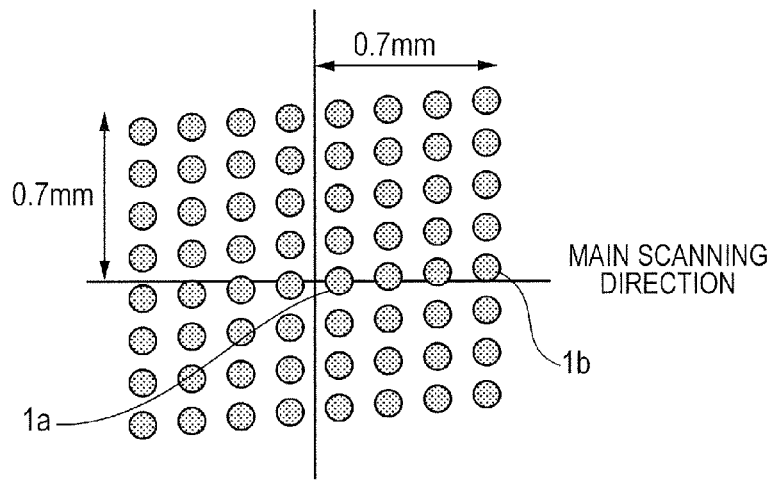
FIG. 9 is a schematic diagram illustrating a configuration of a light source according to a second embodiment of the present invention.

FIG. 9 is a main portion sectional view illustrating arrangement positions of light emission portions of a light source unit used for an optical scanning apparatus according to a second embodiment of the present invention. In the figure, the same elements as those illustrated in FIG. 1 are represented by the same reference numerals or symbols. This embodiment is different from the first embodiment described above in a structure of the light source unit 1. Other structures and optical actions are the same as those in the first embodiment, so that the same effect can be obtained.

The light source unit 1 in this embodiment is constituted of the surface light emission laser having a two-dimensional arrangement, and hence higher-speed and higher-definition image forming apparatus can be achieved more easily than in the first embodiment.

As described above, even in a case where a multi-beam light source unit having a two-dimensional arrangement is used, it is possible to provide the optical scanning apparatus and the image forming apparatus using the same, which can reduce pitch unevenness due to the optical face tangle error and can perform high-definition and high-speed image formation.

Third Embodiment

An optical scanning apparatus according to a third embodiment of the present invention is described. This embodiment is different from the second embodiment in the beam spot diameter on the surface to be scanned. Other structures and actions are the same as those in the second embodiment. In this embodiment, aperture stop diameters of the first aperture stop 2 and the second aperture stop 5 constituting the incident optical system LA are respectively set to 7.0 mm and 1.14 mm so that a minimum spot diameter of the beam on the surface to be scanned becomes 40 µm both in the main scanning direction and in the sub-scanning direction. Thus, it is easier to realize a higher-definition image forming apparatus than in the second embodiment.

Fourth Embodiment

Figure 10:
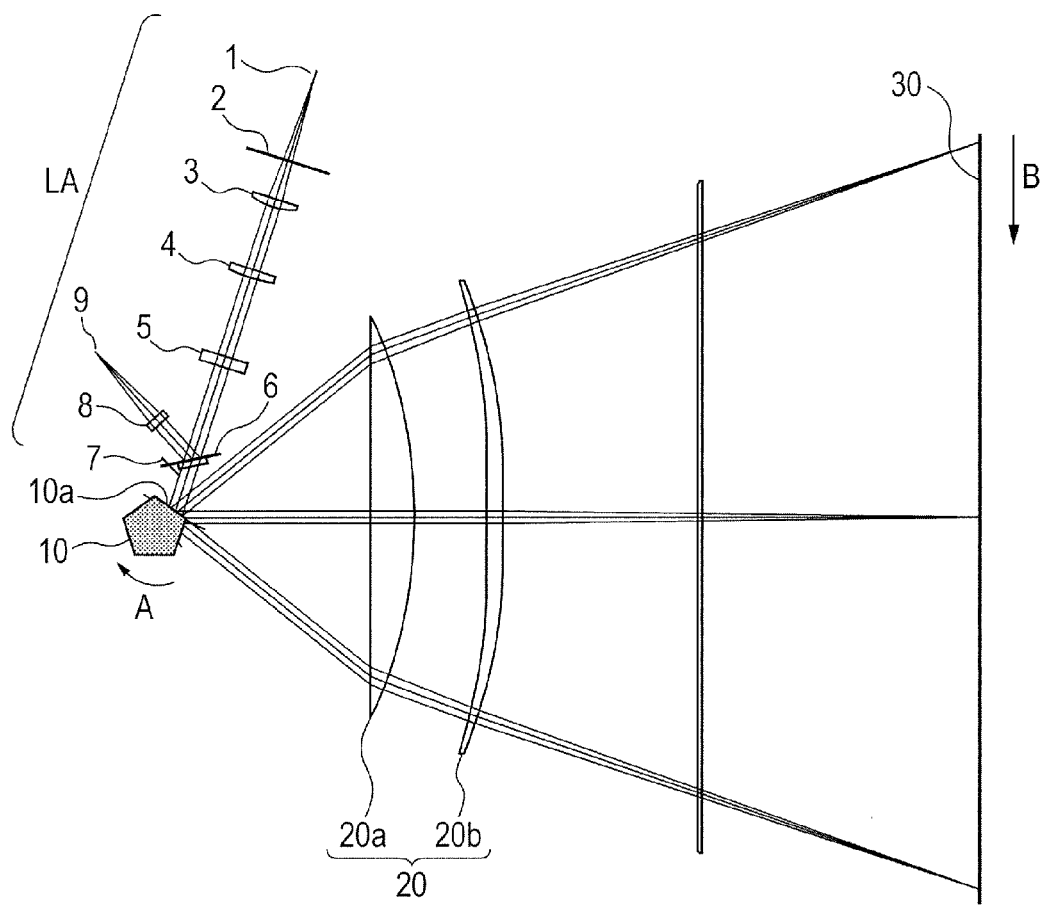
FIG. 10 is a main scanning sectional view of the fourth embodiment.

FIG. 10 is a main scanning sectional view of a fourth embodiment of the present invention. In the figure, a light source unit 1 includes a vertical cavity surface emitting laser (multibeam light source) including a plurality of light emitting points (light emitting portions). At least one of the plurality of light emitting points of the surface light emission laser 1 has a distance from the optical axis of a first optical unit 3 described later, which is different from a distance from the optical axis of another one of the plurality of light emitting points. In this embodiment, the light emitting points are arranged in a one-dimensional manner as illustrated in FIG. 6, and a semiconductor laser including eight light emitting points is used. This is because with use of the eight beam laser, high-speed and high-definition image formation is achieved.

A first aperture stop 2 restricts a beam width of a passing beam in the sub-scanning direction, so as to shape the beam. This is because the principal rays of the eight beams cross in the sub-scanning direction in a vicinity of an fθ lens 20b by disposing the first aperture stop 2 in a vicinity of the collimator lens 3 and by setting the exit pupil position in the sub-scanning direction in a vicinity of the fθ lens 20b.

The condensing lens 3 (hereinafter, referred to as a "collimator lens") serving as the first optical unit is made of glass by a molding process. A surface of the collimator lens 3 on the side of a deflection unit 10 has a rotationally symmetric non-circular (aspheric) shape, so as to reduce a spot diameter difference between the light emitting points described later, and to convert the diverging beam emitted from the light source unit 1 into a collimated beam. A convex spherical lens 4 (spherical lens) made of glass and having a positive refractive power is a spherical lens for adjusting a spot diameter on the surface to be scanned.

A lens system 5 (hereinafter, referred to as a "cylindrical lens") serving as the first optical unit has a power only in the sub-scanning section (sub-scanning direction). The cylindrical lens 5 forms a line image of the beam after passing through the collimator lens 3 and the spherical lens 4 on a deflection surface (reflection surface) 10a of the light deflecting device 10 described later in the sub-scanning section. A second aperture stop 6 restricts a main scanning beam width of the passing beam so as to shape the beam.

The second aperture stop 6 in this embodiment is disposed on the light deflecting device 10 side of the collimator lens 3. A prism 7 having a wedge shape in the main scanning direction is disposed, so that the incident surface of the second aperture stop 6 agrees with that of the prism 7. The incident surface and the exit surface of the prism 7 have an angle of 5 degrees in the main scanning direction. This is because the reflection light from the exit surface does not enter a light intensity detection sensor 9 described later.

An imaging lens 8 is a lens for condensing the beam reflected by the incident surface of the prism 7 to the light intensity detection sensor 9. The light intensity detection sensor 9 is used for controlling each beam of the surface light emission laser 1 to emit light at desired intensity. Unlike an end surface light emission laser, the surface light emission laser 1 cannot include an auto power control (APC) sensor in the element, and thus has the sensor 9 for APC outside the laser.

Note that, the collimator lens 3 and the cylindrical lens 5 may be constituted of a single optical element. In addition, each of the first aperture stop 2, the collimator lens 3, the spherical lens 4, the cylindrical lens 5, and the second aperture stop 6 constitute an element of the incident optical system LA. In addition, the prism 7, each of the imaging lens 8, and the light intensity detection sensor 9 constitute an element of the APC optical system.

The collimator lens 3 has an aspheric surface shape added with an aspheric surface, in which a positive power is weakened from the lens optical axis toward the periphery as described later. Thus, condensing positions (focus positions) of the beams from the plurality of light emitting points on a surface to be scanned or the deflection surface become substantially the same, so that spot diameters of the plurality of beams on the surface to be scanned become substantially the same. In addition, the second aperture stop 6 disposed in a vicinity of the light deflecting device 10 can restrict a beam width in the main scanning direction and bring principal rays of the beams from the light emitting points close to each other on the deflection surface, to thereby reduce vertical line fluctuation that occurs in the case of a multi-beam system.

The light deflecting device 10 as the deflection unit includes a polygon mirror (rotational polygon mirror) having five surfaces, and is rotated at a constant speed in the direction of the arrow A in the figure by a driving unit such as a motor (not shown).

An imaging optical system 20 (fθ lens system) having a condensing function and fθ characteristics includes a first imaging lens 20a and the second imaging lens 20b (fθ lenses). The imaging lens 20a includes a flat convex spherical lens made of glass, and the imaging lens 20b includes an anamorphic lens having an aspheric surface shape in the main scanning section. The imaging optical system 20 forms, on a photosensitive drum surface 30 as the surface to be scanned, an image of the beam based on image information reflected and deflected by the light deflecting device 10. Further, the imaging optical system 20 compensates the optical face tangle error by setting the deflection surface 10a of the light deflecting device 10 and the photosensitive drum surface 30 to be conjugate to each other in the sub-scanning section.

An exit surface of the imaging lens 20b in this embodiment has a non-circular shape in the sub-scanning section, and the non-circular amount thereof is changed in the longitudinal direction (main scanning direction) of the imaging lens 20b. Thus, a wavefront aberration amount in the sub-scanning direction is changed, so that the field curvature in the sub-scanning direction in wave optics is reduced. In addition, the paraxial field curvature of the imaging optical system 20 in the sub-scanning direction is generated appropriately. Thus, a spot position shift in the sub-scanning direction on the surface to be scanned in a case where the optical face tangle error occurs is reduced, and hence the pitch unevenness is reduced. The photosensitive drum surface 30 is the surface to be scanned.

In this embodiment, the plurality of beams (eight in this embodiment) that are modulated in accordance with the image information and are emitted from the light source unit 1 are restricted in the beam width in the sub-scanning direction by the first aperture stop 2. Then, the collimator lens 3 and the spherical lens 4 convert the beams into collimated beams which enter the cylindrical lens 5. The beams entering the cylindrical lens 5 exit as it is in the main scanning section and are restricted in the beam width in the main scanning direction by the second aperture stop 6. In addition, in the sub-scanning section, the beams are converged to pass through the second aperture stop 6 (a beam width in the main scanning direction is restricted), and form the line image (longitudinal line image in the main scanning direction) in a vicinity of the deflection surface 10a of the light deflecting device 10.

Then, each of the plurality of beams reflected and deflected by the deflection surface 10a of the light deflecting device 10 enters the imaging optical system 20 having a positive power mainly in the main scanning direction, and forms a spot image on the photosensitive drum surface 30. The light deflecting device 10 is rotated in the direction of the arrow A, so that the photosensitive drum surface 30 is optically scanned at a constant speed in the direction of the arrow B (in the main scanning direction). Thus, a plurality of scanning lines are formed simultaneously on the photosensitive drum surface as a recording medium, so that an image is recorded. Table 1 shows design parameters of this embodiment.

TABLE 2

| | |
|---|---|
| Operating wavelength (mm) | 6.80E−07 |
| Refractive index of imaging unit 20a (λ = 680 nm) | 1.79364 |
| Refractive index of imaging unit 20b (λ = 680 nm) | 1.52694 |
| Number of surfaces of deflection unit | 5 |
| Radius of circumscribed circle of deflection unit (mm) | 34 |
| Rotation angle of deflection unit (±deg.) | 19.56 |
| Incident angle in main scanning direction (deg.) | 70 |
| Incident angle in sub-scanning direction (deg.) | 0 |
| Axial deflection point to incident surface of first imaging lens (mm) | 9.00E+01 |
| Focal length of imaging lens (mm) | 2.50E+02 |
| Best spot diameter on surface to be scanned (main × sub μm) | 40 × 40 |

Rotation center coordinates of deflection unit

| | |
|---|---|
| X | −11.95 |
| Y | −6.91 |

| | R1 surface | | R2 surface | |
|---|---|---|---|---|
| | Scanning start side (s) | Scanning end side (e) | Scanning start side (s) | Scanning end side (e) |
| Main scanning | d | 2.00E+01 | d | 3.260E+01 |
| Sub-scanning | R | ∞ | R | −2.26E+02 |
| | r | ∞ | r | −2.26E+02 |

| | | R3 surface | | R4 surface | |
|---|---|---|---|---|---|
| | | Scanning start side (s) | Scanning end side (e) | Scanning start side (s) | Scanning end side (e) |
| Main scanning section | d | 7.50E+00 | | d | 2.18E+02 | |
| | R | 4.44E+03 | | R | −1.24E+03 | |
| | K | 4.01E+01 | K 4.01E+01 | K | −1.52E+01 | K −1.52E+01 |
| | B4 | −2.41E−07 | B4 −2.41E−07 | B4 | −2.30E−07 | B4 −2.30E−07 |
| | B6 | 1.79E−11 | B6 1.79E−11 | B6 | 1.62E−11 | B6 1.62E−11 |
| | B8 | −7.70E−16 | B8 −7.70E−16 | B8 | −6.60E−16 | B8 −6.60E−16 |
| | B10 | 2.31E−20 | B10 2.31E−20 | B10 | 2.11E−20 | B10 2.11E−20 |
| Sub-scanning section | r | −7.95E+01 | | r | −3.33E+01 | |
| | D2 | 2.11E−04 | D2 4.98E−04 | D2 | 8.59E−05 | D2 1.89E−04 |
| | D4 | −2.33E−08 | D4 −5.72E−10 | D4 | −1.36E−08 | D4 −3.91E−08 |
| | D6 | 0.00E+00 | D6 0.00E+00 | D6 | 1.44E−12 | D6 6.92E−12 |
| | D8 | 0.00E+00 | D8 0.00E+00 | D8 | −9.64E−17 | D8 −6.74E−16 |
| | D10 | 0.00E+00 | D10 0.00E+00 | D10 | 4.62E−22 | D10 2.66E−20 |
| | M0 | 0.00E+00 | | M0 | 3.30E−06 | |
| | M1 | 0.00E+00 | | M1 | −5.77E−09 | |
| | M2 | 0.00E+00 | | M2 | −6.12E−10 | |
| | M3 | 0.00E+00 | | M3 | 7.28E−13 | |
| | M4 | 0.00E+00 | | M4 | 2.51E−14 | |

Incident optical system

| | r | d | N (680 nm) |
|---|---|---|---|
| Light source (light emitting point) | 0 | 43.15 | 1.0000 |
| Aperture stop in sub-scanning direction | | 17.9790 | 1.0000 |
| Collimator lens* | ∞ | 3.5900 | 1.5793 |
| | −46.2638 | 76.0000 | 1.0000 |
| Spherical lens | ∞ | 4.0000 | 1.5131 |
| | 171.9690 | 30.0000 | 1.0000 |
| Cylindrical lens | ∞(−38.08) | 5.0000 | 1.5131 |
| | ∞ | 44.4300 | 1.0000 |
| Aperture stop in main scanning direction | | 25.0000 | |
| Wedge prism | ∞ | 2.3804 | 1.5131 |
| | ∞ | 25.0500 | 1.0000 |
| Deflection surface | ∞ | 0.0000 | 1.0000 |

Aspherical coefficient

| | |
|---|---|
| A | 0.00E+00 |
| B | 7.78E−07 |
| C | −4.79E−09 |
| D | 0.00E+00 |
| E | 0.00E+00 |
| F | 0.00E+00 |
| G | 0.00E+00 |

*aspherical surface, ( ) is sub-scanning direction

In this embodiment, the scanning optical system is constituted as shown in Table 2. In this embodiment, a shape of the imaging lens 20b has an origin that is an intersection point between the imaging lens and the optical axis. As illustrated in FIG. 14, it is supposed that on a scanning start side and on a scanning end side on the optical axis, the optical axis is an X axis, a direction perpendicular to the optical axis in a main scanning section is a Y axis, and a direction perpendicular to the optical axis in the sub-scanning section is a Z axis, which are expressed by the above-mentioned functions (a) and (b).

In addition, as to the imaging lens 20b, the incident surface has a circular sectional shape in the sub-scanning direction, and the exit surface has a non-circular sectional shape in the sub-scanning direction including a fourth order term of Z. The non-circular amount of the exit surface varies in the longitudinal direction. Further, the shape of the imaging lens 20b in the sub-scanning direction continuously varies in an effective range of the lens, in which the curvature 1/r in the sub-scanning section (surface that includes the optical axis and is perpendicular to the main scanning section) of the incident surface and the fourth order aspherical coefficient are functions of Y on the scanning start side and on the scanning end side with respect to the optical axis.

The shape in the sub-scanning direction can be expressed by the following continuous function, in which the optical axis is the X axis on the scanning start side and the scanning end side with respect to the optical axis, the direction perpendicular to the optical axis in the main scanning section is the Y axis, and the direction perpendicular to the optical axis in the sub-scanning section is the Z axis.

Sub-Scanning Direction Function of r3 and r4 Surfaces $$S = \frac{\frac{z^2}{r'}}{1 + \sqrt{1 - (z/r')^2}} + \sum_{i=0}^{10} M_i y^i Z^4$$

$$r' = r(1 + D_{2s}y^2 + D_{4s}y^4 + D_{6s}y^6 + D_{8s}y^8 + D_{10s}y^{10})$$

$$S = \frac{\frac{z^2}{r'}}{1 + \sqrt{1 - (z/r')^2}} + \sum_{i=0}^{10} M_i y^i Z^4$$

$$r' = r(1 + D_{2e}y^2 + D_{4e}y^4 + D_{6e}y^6 + D_{8e}y^8 + D_{10e}y^{10})$$

r' represents a curvature radius in the sub-scanning direction, Dj represents a curvature variation coefficient, and Mi represents a sagittal line aspherical coefficient.

In a case where the coefficient is different between a positive side and a negative side of Y, suffix s indicates the scanning start side, and suffix e indicates the scanning end side. In addition, the curvature radius in the sub-scanning direction means a curvature radius in the cross section perpendicular to the shape (meridional line) in the main scanning direction.

Figure 11:
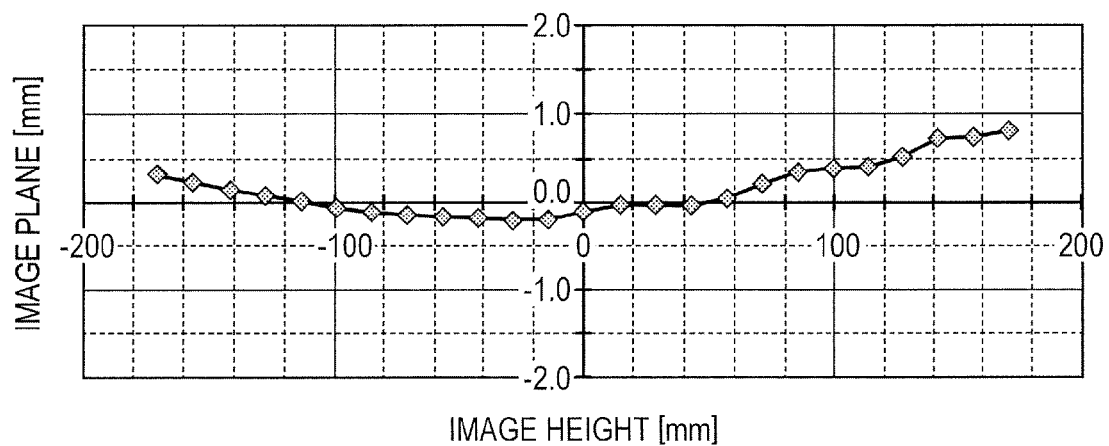
FIG. 11 is a graph showing an optical performance of a sub-scanning image plane (Gauss image plane) according to the fourth embodiment.

In this embodiment, as shown in FIG. 11, the Gauss image plane in the sub-scanning direction has the values of:

$ds(Y=0)=-0.11$, and $ds(Y\max=170)=0.81$, and satisfies the following conditional expressions:

$ds(Y=0)<0$, and $ds(Y=Y\max)>0$.

In addition,
r=17,
M=5,
$\theta_f$=19.56, and
$\alpha$=70,
and further
$\Delta$=0.50, and
$\beta$=−1.68,
the following values are derived:

$0.2\delta\beta^2=0.70$, and $0.8\delta\beta^2=2.81$.

Figure 12A:
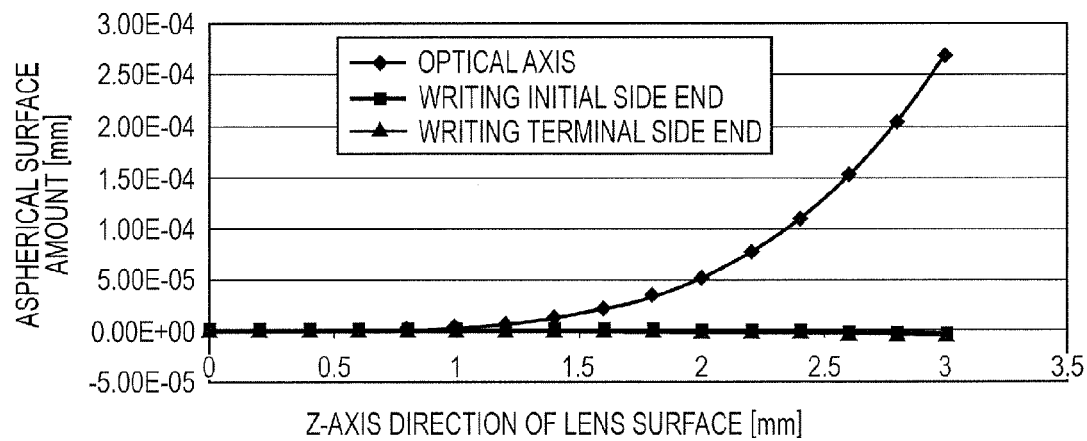
FIG. 12A is a graph showing a sub-scanning non-circular amount according to the fourth embodiment.
Figure 12B:
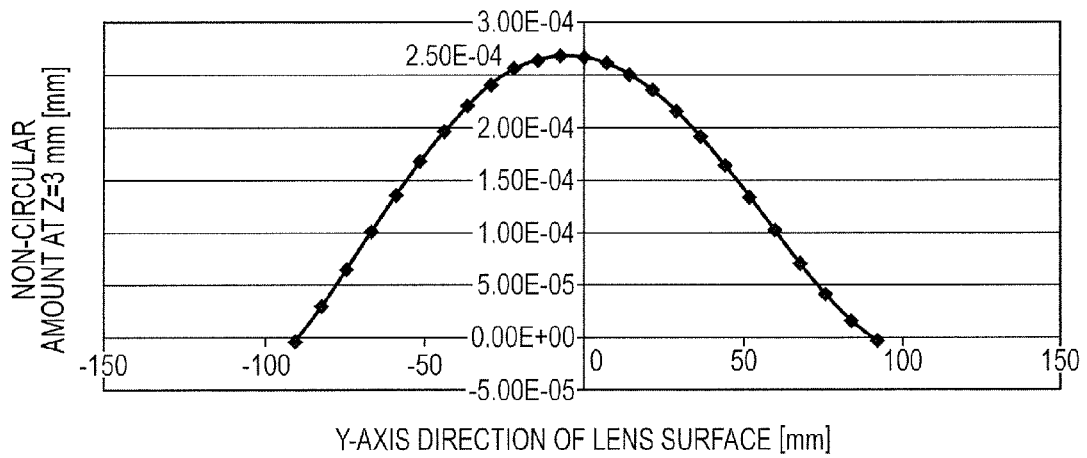
FIG. 12B is a graph showing a sub-scanning non-circular amount according to the fourth embodiment.

As shown in FIGS. 12A and 12B, it is understood that the axial and off-axial Gauss image planes in the sub-scanning direction satisfy the conditional expression.

$0.2\delta\beta^2<|ds(Y=Y\max)|<0.8\delta\beta^2$

FIGS. 12A and 12B show non-circular amounts of the non-circular surface according to this embodiment. FIG. 12A shows a non-circular amount in the sub-scanning direction of the exit surface of the lens 20b illustrated in FIG. 9. Because a beam width in the sub-scanning direction is 6 mm in this embodiment, positions of Z=±3 mm are positions at which marginal rays in the sub-scanning direction pass (sub-scanning beam edges). In the figure, the horizontal axis represents the sub-scanning direction Z on the lens surface, and the sagittal line non-circular amount changes continuously from a vicinity of the optical axis at Z=0 in the sub-scanning direction to the sub-scanning beam edge at Z=3.

In addition, the non-circular amount in a vicinity of the optical axis and a writing terminal side end is larger than the non-circular amount on the writing initial side (an effective end on the positive side in the Y coordinate) and on the writing terminal side (an effective end on the negative side in the Y coordinate), and hence both the pitch unevenness reduction and the image plane position compensation in wave optics are achieved.

FIG. 12B shows a change in the main scanning direction of the non-circular amount at the beam edge in the sub-scanning direction. The non-circular amount of the exit surface of the lens 20b becomes 268 nm at most in a vicinity of the optical axis (lens coordinate Y=−7 mm) of the lens and is monotonously decreased toward the end of the lens in the longitudinal (Y) direction. A non-circular amount at an image height on the writing initial side (Y positive) and the writing terminal side (Y negative) is smaller than that in a vicinity of the image center. In addition, the non-circular amount has a positive value in substantially the entire region in order to compensate spherical aberration in the sub-scanning direction.

Figure 13:
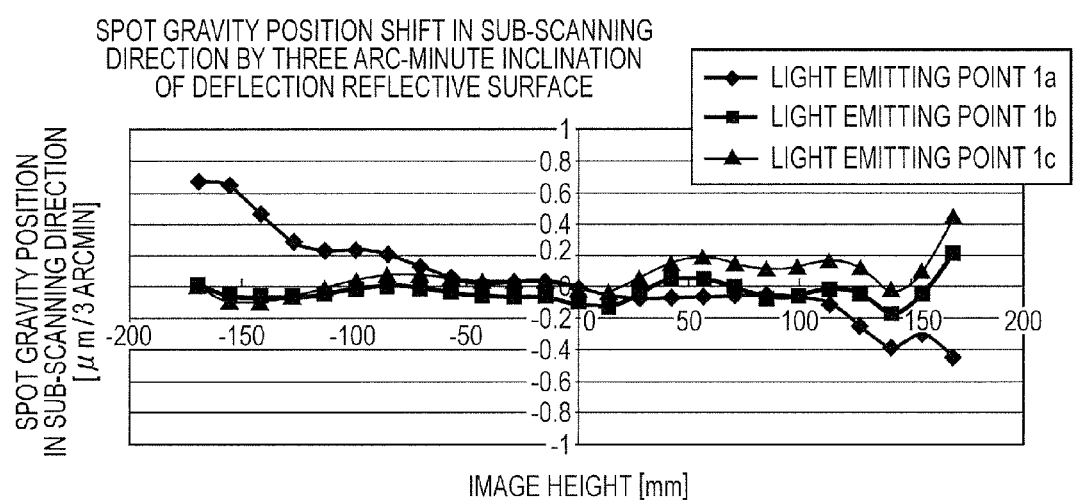
FIG. 13 is a graph showing a spot position in a case where an optical face tangle error occurs according to the fourth embodiment.

FIG. 13 shows optical face tangle error performance for the beams emitted from the light emitting points 1a, 1b, and 1c of this embodiment. In the figure, the horizontal axis represents the image height, and the vertical axis represents the spot gravity position shift in the sub-scanning direction on the surface to be scanned in a case where the deflection surface is inclined by three arc-minute. In this embodiment, even if the deflection surface is inclined by three arc-minute, the gravity position shift of 0.7 μm or smaller, namely within ±2 μm is achieved in the entire region of the surface to be scanned for all the beams including the light emitting points 1a to 1c.

Image Forming Apparatus

Figure 15:
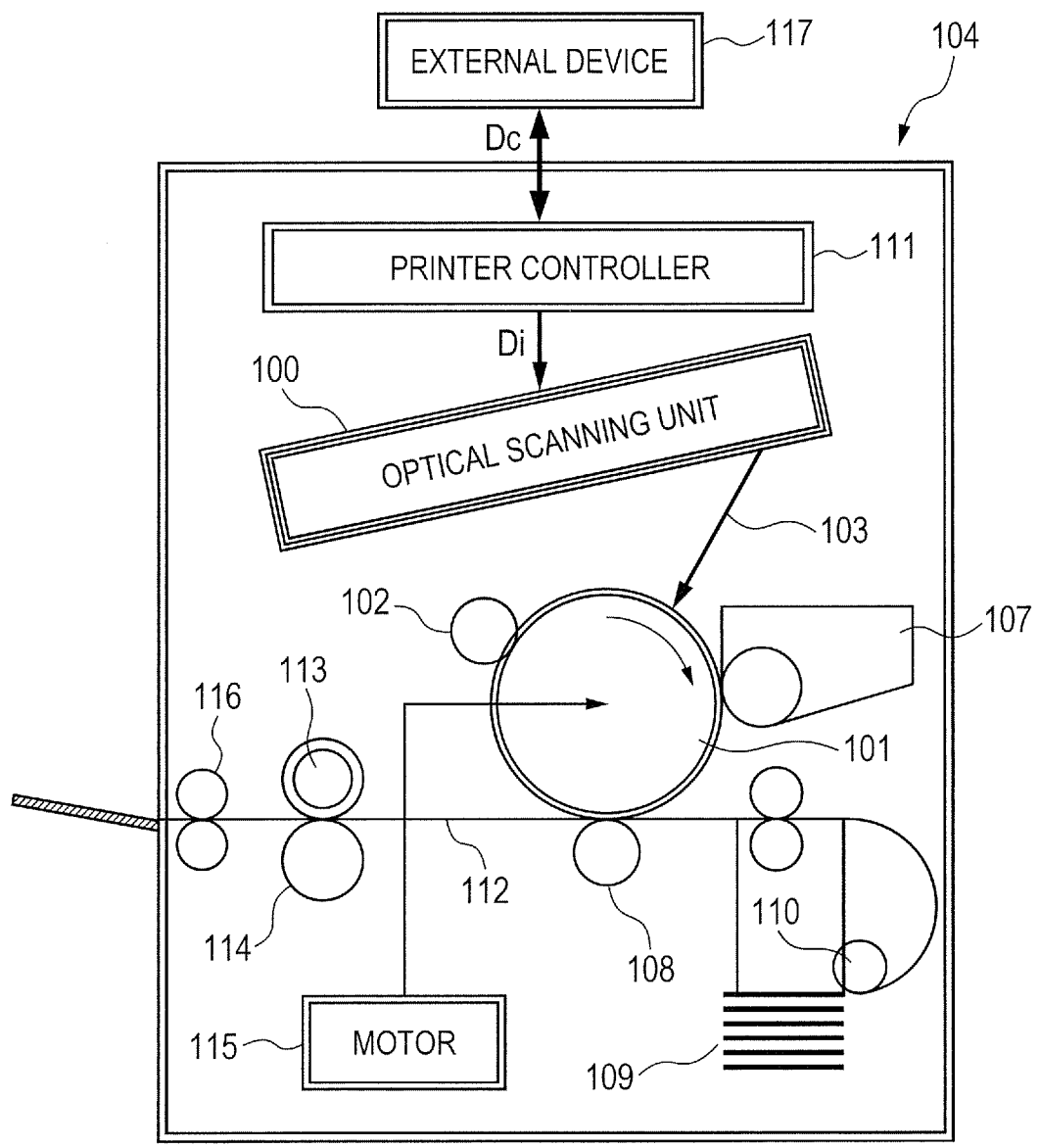
FIG. 15 is a schematic diagram of an image forming apparatus according to the present invention.

FIG. 15 is a principal sectional view in the sub-scanning direction, illustrating an image forming apparatus according to an embodiment of the present invention. FIG. 15 illustrates an image forming apparatus 104. Code data Dc is input from an external device 117, for example, a personal computer, to the image forming apparatus 104. The code data Dc is converted into image data (dot data) Di by a printer controller 111 included in the image forming apparatus 104. The image data Di is input to an optical scanning unit (multi-beam optical scanning apparatus) 100 having the structure described in any one of the first to third embodiments.

A light beam 103 modulated based on the image data Di is emitted from the optical scanning unit 100. A photosensitive surface of a photosensitive drum 101 is scanned with the light beam 103 in the main scanning direction. The photosensitive drum 101 serving as an electrostatic latent image bearing member (photosensitive member) is rotated clockwise by a motor 115. With the rotation, the photosensitive surface of the photosensitive drum 101 is moved relative to the light beam 103 in the sub-scanning direction orthogonal to the main scanning direction.

A charging roller 102 for uniformly charging the surface of the photosensitive drum 101 is provided on the photosensitive drum 101 as being in contact with the surface thereof. The surface of the photosensitive drum 101 which is charged by the charging roller 102 is irradiated with the light beam 103 for scanning by the optical scanning unit 100.

As described above, the light beam 103 is modulated based on the image data Di, and hence an electrostatic latent image is formed on the surface of the photosensitive drum 101 which is irradiated with the light beam 103. The electrostatic latent image is developed into a toner image by a developing device 107 provided in contact with the photosensitive drum 101 on the more downstream side than the irradiation position of the light beam 103 in the rotation direction of the photosensitive drum 101.

The toner image obtained by the developing device 107 is transferred onto a sheet 112 serving as a transfer material by a transfer roller 108 which is provided under the photosensitive drum 101 and opposed to the photosensitive drum 101 and which constitutes one member of a transferring device. The sheet 112 is stored in a sheet cassette 109 provided in front (in the right in FIG. 15) of the photosensitive drum 101. The sheet 112 may be manually fed. A feed roller 110 is provided at an end portion of the sheet cassette 109 to feed the sheet 112 stored in the sheet cassette 109 to a transport path.

Then, the sheet 112 on which the unfixed toner image is transferred is conveyed to a fixing device provided in the rear (in the left in FIG. 15) of the photosensitive drum 101. The fixing device includes a fixing roller 113 having a fixing heater (not shown) and a pressure roller 114 which is provided in press contact with the fixing roller 113. The sheet 112 conveyed from the transfer portion is heated under a pressurized state in a portion in which the fixing roller 113 and the pressure roller 114 are in press contact with each other, to thereby fix the unfixed toner image on the sheet 112. A discharge roller 116 is provided in the rear of the fixing roller 113 to discharge the sheet 112 having a fixed image to the outside of the image forming apparatus.

Although not illustrated in FIG. 15, the printer controller 111 not only performs the data conversion described above but also controls, for example, polygon motors including the motor 115, which are provided in respective parts of the image forming apparatus and in an optical scanning unit described later.

Color Image Forming Apparatus

Figure 16:
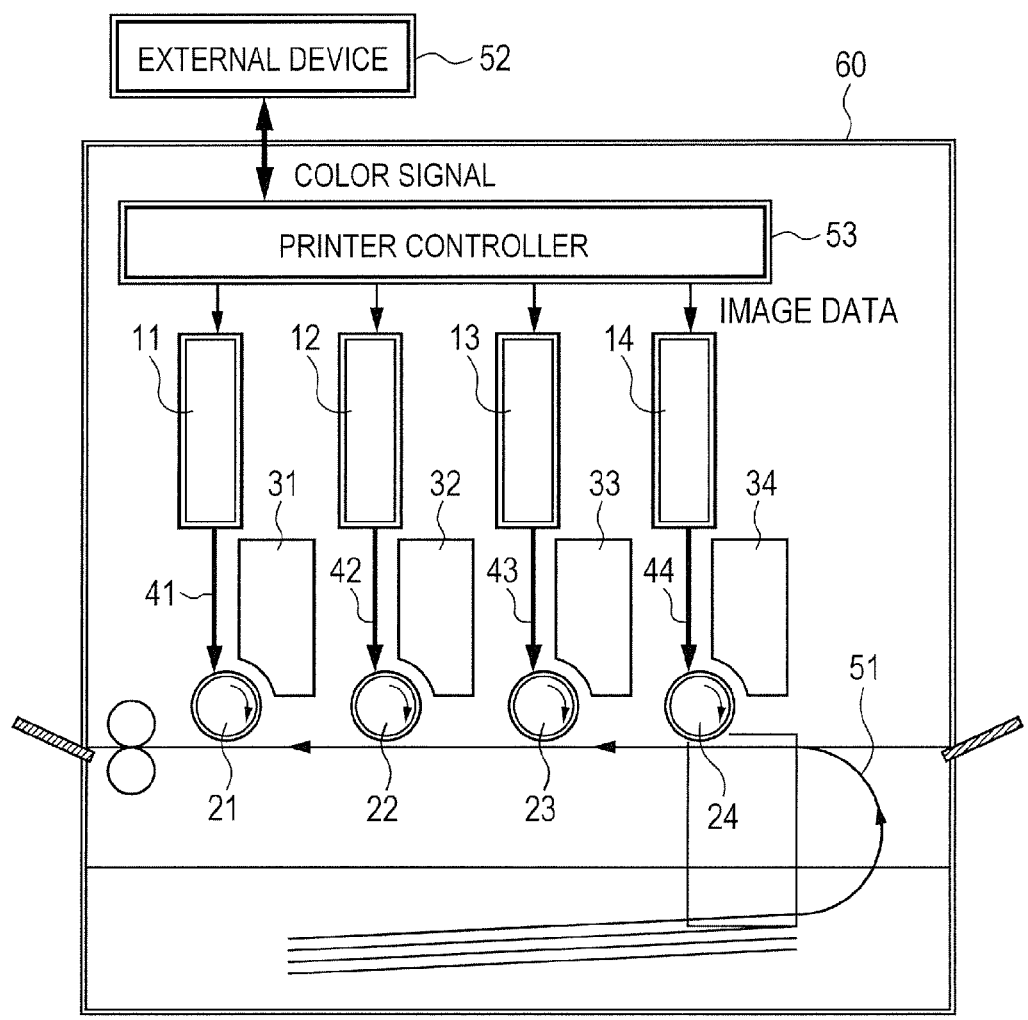
FIG. 16 is a schematic diagram of a color image forming apparatus according to the present invention.

FIG. 16 is a schematic diagram illustrating a main portion of a color image forming apparatus according to an embodiment of the present invention. The color image forming apparatus of this embodiment is of tandem type, which includes four optical scanning apparatus (multi-beam optical scanning apparatus) arranged side by side to record concurrently image information on surfaces of photosensitive drums, which serve as image bearing members. FIG. 16 illustrates a color image forming apparatus 60, optical scanning apparatus 11, 12, 13, and 14 structured as illustrated in any one of the embodiments, photosensitive drums 21, 22, 23, and 24 serving as image bearing members, developing devices 31, 32, 33, and 34, and a conveyor belt 51.

In FIG. 16, respective color signals of red (R), green (G), and blue (B) are input from an external device 52 such as a personal computer to the color image forming apparatus 60. The color signals are converted into pieces of image data (dot data) of cyan (C), magenta (M), yellow (Y), and black (B) by a printer controller 53 in the color image forming apparatus. The respective pieces of image data are input to the optical scanning apparatus 11, 12, 13, and 14.

Light beams 41, 42, 43, and 44, which are modulated according to the respective pieces of image data, are emitted from the optical scanning apparatus. The photosensitive surfaces of the photosensitive drums 21, 22, 23, and 24 are scanned with the light beams in a main scanning direction.

In the color image forming apparatus of this embodiment, the four optical scanning apparatus are arranged side by side, corresponding to the respective colors of cyan (C), magenta (M), yellow (Y), and black (B). The optical scanning apparatus concurrently record the image signals (image information) on the surfaces of the photosensitive drums 21, 22, 23, and 24, and print a color image at high speed.

As described above, the color image forming apparatus of this embodiment uses the light beams which are respectively based on image data and emitted from the four optical scanning apparatus 11, 12, 13, and 14 to form latent images of four colors on the surfaces of the photosensitive drums 21, 22, 23, and 24 respectively associated with the four colors. The latent images are then transferred to a recording material one on another through multilayer transfer to form one full color image.

The external device 52 may be a color image reading device including, for example, a CCD sensor. In this case, the color image reading device and the color image forming apparatus 60 constitute a color digital copying machine.

According to this embodiment described above, it is possible to provide the optical scanning apparatus capable of performing high definition image formation by reducing the pitch unevenness in wave optics and the sub-scanning field curvature in a case where an optical face tangle error is generated on the deflection surface.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-190760, filed Sep. 1, 2011, which is hereby incorporated by reference herein in its entirety.

What is claimed is:

1. An optical scanning apparatus, comprising:
a light source unit emitting beam from an emitting point;
a deflection unit which deflects a beam from the light source unit for scanning a surface to be scanned in a main scanning direction;
an incident optical system which forms a focal line image of the emitting point; and
an imaging optical system including a plurality of optical surfaces for forming an image of the emitting point by using the beam deflected by the deflection surface on the surface to be scanned or a vicinity thereof, wherein at least one of the plurality of optical surfaces has a non-circular shape in a sub-scanning section perpendicular to the main scanning direction, and a non-circular amount of the non-circular shape changes along the main scanning direction, and wherein the following conditions are satisfied:

$$ds(Y=0)<0;$$

and $$ds(Y=Y\max)>0,$$

where $ds(Y=0)$ represents a paraxial field curvature in the sub-scanning section at a center position within an effective scanning range of the surface to be scanned in the main scanning direction and $ds(Y=Y\max)$ represents a paraxial field curvature in the sub-scanning section at a maximum image height within the effective scanning range.

2. An optical scanning apparatus according to claim 1, wherein the non-circular amount at a beam edge in the sub-scanning direction is 500 nm or less, and the non-circular amount changes monotonously from axis to off-axis.

3. An optical scanning apparatus according to claim 1, wherein the following condition is satisfied:

$$|\delta P0|>|\delta P1|,$$

where $\delta P0$ represents a non-circular amount of a beam edge in the sub-scanning direction on an optical axis in the main scanning direction, and $\delta P1$ represents a non-circular amount of the beam edge in the sub-scanning direction at an effective end in the main scanning direction.

4. An optical scanning apparatus according to claim 1, wherein a non-circular surface in the sub-scanning section is formed on an imaging lens in which the beam enters with a largest beam width in the sub-scanning direction.

5. An optical scanning apparatus according to claim 1, wherein the light source unit includes a plurality of emitting points, and the imaging optical system has a structure in which a beam farthest from an optical axis among a plurality of beams emitted from the plurality of emitting points has a spot intensity gravity position shift within ±2 μm on the surface to be scanned in the sub-scanning direction in a case where the deflection surface of the deflection unit is inclined in the sub-scanning direction by three arc-minute.

6. An optical scanning apparatus according to claim 5, wherein principal rays of the plurality of beams emitted from the plurality of emitting points pass through an optical surface of the imaging optical system having largest power in the sub-scanning direction, at the same position in the sub-scanning direction.

7. An optical scanning apparatus according to claim 6, wherein the non-circular shape is formed on an optical surface of an imaging lens of the imaging optical system in which the beam enters with a smallest beam width in the main scanning direction.

8. An image forming apparatus, comprising:
an optical scanning apparatus, comprising:
  a light source unit emitting beam from an emitting point;
  a deflection unit which deflects a beam from the light source unit for scanning a surface to be scanned in a main scanning direction;
  an incident optical system which forms a focal line image of the emitting point; and
  an imaging optical system including a plurality of optical surfaces for forming an image of the emitting point by using the beam deflected by the deflection surface on the surface to be scanned or a vicinity thereof,
  wherein at least one of the plurality of optical surfaces has a non-circular shape in a sub-scanning section perpendicular to the main scanning direction, and a non-circular amount of the non-circular shape changes along the main scanning direction, and
  wherein the following conditions are satisfied:

$$ds(Y=0)<0;$$

and $$ds(Y=Y\max)>0,$$

where $ds(Y=0)$ represents a paraxial field curvature in the sub-scanning section at a center position within an effective scanning range of the surface to be scanned in the main scanning direction and $ds(Y=Y\max)$ represents a paraxial field curvature in the sub-scanning section at a maximum image height within the effective scanning range;

a photosensitive member disposed on the surface to be scanned;

a developing device for developing an electrostatic latent image formed on the photosensitive member scanned by a beam from the optical scanning apparatus, as a toner image;

a transferring device for transferring the developed toner image onto a transfer member; and a fixing device for fixing the transferred toner image onto the transfer member.

9. An image forming apparatus, comprising:
an optical scanning apparatus, comprising:
  a light source unit emitting beam from an emitting point;
  a deflection unit which deflects a beam from the light source unit for scanning a surface to be scanned in a main scanning direction;
  an incident optical system which forms a focal line image of the emitting point; and
  an imaging optical system including a plurality of optical surfaces for forming an image of the emitting point by using the beam deflected by the deflection surface on the surface to be scanned or a vicinity thereof,
  wherein at least one of the plurality of optical surfaces has a non-circular shape in a sub-scanning section perpendicular to the main scanning direction, and a non-circular amount of the non-circular shape changes along the main scanning direction, and
  wherein the following conditions are satisfied:

$$ds(Y=0)<0;$$

and $$ds(Y=Y\max)>0,$$

where $ds(Y=0)$ represents a paraxial field curvature in the sub-scanning section at a center position within an effective scanning range of the surface to be scanned in the main scanning direction and $ds(Y=Y\max)$ represents a paraxial field curvature in the sub-scanning section at a maximum image height within the effective scanning range; and a printer controller which converts code data input from an external device into an image signal, and inputs the image signal to the optical scanning apparatus.

* * * * *